United States Patent
Matsumoto

(10) Patent No.: US 7,778,451 B2
(45) Date of Patent: Aug. 17, 2010

(54) CYLINDRICAL PROJECTED PICTURE GENERATION METHOD, PROGRAM, AND CYLINDRICAL PROJECTED PICTURE GENERATION DEVICE

(75) Inventor: Kazuhiko Matsumoto, Tokyo (JP)

(73) Assignee: Ziosoft Inc., Tokyo (JP)

( * ) Notice: Subject to any disclaimer, the term of this patent is extended or adjusted under 35 U.S.C. 154(b) by 1174 days.

(21) Appl. No.: 11/395,331

(22) Filed: Mar. 31, 2006

(65) Prior Publication Data

US 2006/0238534 A1    Oct. 26, 2006

(30) Foreign Application Priority Data

Apr. 22, 2005  (JP) .............................. 2005-125096

(51) Int. Cl.
*G06K 9/00* (2006.01)
*G06T 17/00* (2006.01)
*G09G 5/00* (2006.01)

(52) U.S. Cl. ...................... 382/128; 382/131; 382/132; 345/420; 345/619; 345/629; 345/630

(58) Field of Classification Search ................ 382/128, 382/131–132, 154; 345/420, 424, 581, 619–621, 345/625, 629–630
See application file for complete search history.

(56) References Cited

U.S. PATENT DOCUMENTS

| | | | | |
|---|---|---|---|---|
| 5,734,384 A * | 3/1998 | Yanof et al. | ................. | 345/424 |
| 5,963,211 A * | 10/1999 | Oikawa et al. | ............... | 345/424 |
| 6,014,143 A * | 1/2000 | Naqvi et al. | ................. | 345/424 |
| 6,212,420 B1 * | 4/2001 | Wang et al. | ................. | 600/407 |
| 6,212,430 B1 * | 4/2001 | Kung | ........................... | 607/61 |
| 6,246,413 B1 * | 6/2001 | Teo | ............................ | 345/419 |
| 6,456,735 B1 * | 9/2002 | Sato et al. | ................... | 382/131 |
| 6,928,314 B1 * | 8/2005 | Johnson et al. | ............. | 600/407 |
| 6,947,039 B2 * | 9/2005 | Gerritsen et al. | ............ | 345/419 |
| 7,310,095 B2 * | 12/2007 | Matsumoto | ................. | 345/419 |
| 7,424,140 B2 * | 9/2008 | Matsumoto | ................. | 382/128 |
| 7,643,662 B2 * | 1/2010 | Gering | ....................... | 382/128 |

(Continued)

FOREIGN PATENT DOCUMENTS

JP     8-249492     9/1996

(Continued)

OTHER PUBLICATIONS

Anna Vilanova Bartroli, et al., Virtual Colon Unfolding, IEEE Visualization, 2001, p. 411-420.

*Primary Examiner*—Wenpeng Chen
*Assistant Examiner*—Gandhi Thirugnanam
(74) *Attorney, Agent, or Firm*—Caesar, Rivise, Bernstein, Cohen & Pokotilow, Ltd.

(57) ABSTRACT

An exfoliated picture projection method and device are provided which are capable of outputting distortion information of three-dimensional picture data. A distortion amount is calculated in accordance with the difference between the position of a reference virtual ray and the position of a virtual ray projected during creating of the exfoliated picture, coloring is added to the virtual rays in accordance with the distortion amount, and the colored virtual rays are projected to generate exfoliated picture data. Then, the same virtual rays are projected to generate perspective projective picture data, and the exfoliated picture data and perspective projective picture data are subjected to post processing. Therefore, the obtained exfoliated picture and perspective projection picture are output to a monitor.

42 Claims, 16 Drawing Sheets

U.S. PATENT DOCUMENTS

| | | | |
|---|---|---|---|
| 2002/0181802 A1* | 12/2002 | Peterson | 382/284 |
| 2002/0190980 A1* | 12/2002 | Gerritsen et al. | 345/419 |
| 2006/0002626 A1* | 1/2006 | Matsumoto | 382/276 |
| 2006/0056675 A1 | 3/2006 | Verdonck | |
| 2006/0056730 A1* | 3/2006 | Matsumoto | 382/285 |
| 2006/0238534 A1* | 10/2006 | Matsumoto | 345/420 |

FOREIGN PATENT DOCUMENTS

| | | |
|---|---|---|
| JP | 2002-82996 | 3/2002 |
| JP | 2005-518915 | 9/2003 |
| JP | 2005-537558 | 3/2006 |
| WO | 03077202 A1 | 9/2003 |

\* cited by examiner

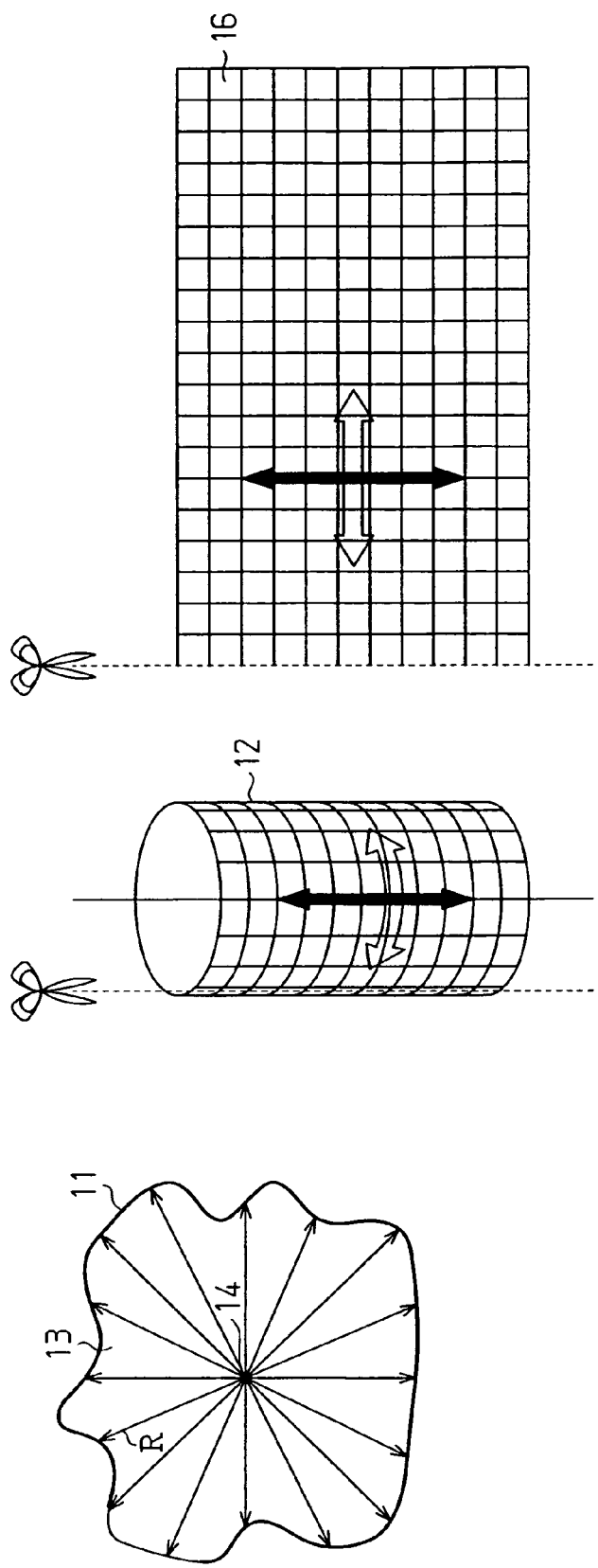

CYLINDRICAL PROJECTED PICTURE GENERATION METHOD, PROGRAM, AND CYLINDRICAL PROJECTED PICTURE GENERATION DEVICE

BACKGROUND OF THE INVENTION

The present invention relates to an exfoliated picture projection method, program, and exfoliated picture projection device.

Conventionally, in the course of medical activities such as diagnosis and treatment, medical image information relating to internal organs and created by medical diagnostic imaging apparatuses, such as X-ray diagnostic devices, X-ray CT (computerized tomographic) devices, magnetic resonance imaging devices (MRI) and the like, is subjected to image processing so as to be displayed three-dimensionally, and allow three-dimensional observation for diagnosis or treatment purposes. For example, the following methods are used as three-dimensional display methods for displaying tubular organs, such as the trachea, digestive tract, and even blood vessels within internal organs and the like.

One such method is the parallel projective method in which a tubular organ is externally illuminated by parallel virtual rays, and the tubular organ is projected onto a two-dimensional plane. As shown in FIG. 24, a parallel projective image P1 produced by the parallel projective method is suitable for observing the exterior of a tubular organ, however, the interior of the organ cannot be observed. A perspective projective image P2 is created by the perspective projective method, which sets a point of view in the interior of a tubular organ and illuminates the interior with radial virtual rays from the point of view so as to project an image of the interior of a tubular organ onto a two-dimensional plane. As shown in FIG. 25, the perspective projective image P2 is used as a virtual endoscope since the inside of the tubular organ can be observed as an endoscopic image. Although the inside of the tubular organ can be viewed in the perspective projective image P2, there has been concern that polyps and the like may be overlooked unless the entire interior surface of the tubular organ is closely and minutely examined when making a diagnosis. Furthermore, it has been difficult to observe the backside of folds in the tubular organ walls and the like.

In another method, an exfoliated picture exfoliated on a two-dimensional plane is displayed by projecting a tubular organ to a cylindrical projection surface virtually arranged on the surroundings of the tubular organ, using a cylindrical projection method, or inflected cylindrical projection method. Then, the projection picture is exfoliated by cutting the cylindrical projection surface along its axis (for example, A. Vilanova Bartroli, R. Wegenkittl, A. Konig, E. Groller, "Virtual Colon Unfolding," IEEE Visualization, USA, 2001, pp. 411-420). As shown in the exfoliated picture P3 of FIG. 26, polyps and the like are readily observable since the inner wall surface of the tubular organ can be seen on a two-dimensional surface.

In the exfoliated picture P3, however, the surface area of a predetermined part on the exfoliated picture is not proportional to the surface area of the actual tubular organ. As shown in FIG. 27, for example, when a tubular organ 50 is inflected, since the inflected part is exfoliated on a two-dimensional plane generated by unrolling the cylindrical projection surface, the inner side of the inflected part is expanded in the exfoliated picture P3 as indicated by the solid arrow, and is displayed larger than the actual tubular organ. In contrast, the outer side of the inflected part is compressed in the exfoliated picture P3 so as to be displayed smaller than the actual tubular organ, as indicated by the dashed arrow. Furthermore, even when the expansion of the inner side and compression of the outer side occurs to the same extent and the surface area in the exfoliated picture and the surface area of the actual tubular organ are equal in total, the exfoliated picture P3 is distortedly displayed since the aspect ratio in the exfoliated picture differs from the actual tubular organ. These distortions have been the cause of misdiagnosis since expanded polyps appear as folds of the interior of the tubular organ, and compressed folds appear as polyps. Although it is now possible to perform medical examinations by visually comparing the exfoliated picture P3 and perspective projective image P2 to confirm polyps in spite of the distortion in the exfoliated picture P3, particular care must be taken when examining conspicuously distorted locations since a polyp may be misidentified as a fold.

SUMMARY OF THE INVENTION

The present invention provides an exfoliated picture projection method, exfoliated picture projection program, and exfoliated picture projection device capable of outputting distortion information of the picture data in three or more dimensions.

One aspect of the present invention is a method for generating an exfoliated picture by executing either one of sole processing and distributed processing with at least one computer to project picture data for three or more dimensions on a cylindrical projection surface and exfoliate the cylindrical projection surface on a projection plane corresponding to the cylindrical projection surface. The method includes calculating distortion occurring in each of a plurality of pixels configuring the exfoliated picture, and outputting distortion information including the distortion and occurrence location of the distortion together with the exfoliated picture.

Another aspect of the present invention is a computer program device comprising a computer readable recording medium encoded with a program for generating an exfoliated picture by executing either one of sole processing and distributed processing with at least one computer to project picture data for three or more dimensions on a cylindrical projection surface and exfoliate the cylindrical projection surface on a projection plane corresponding to the cylindrical projection surface. The program when executed by the at least one computer causes the at least one computer to execute steps including calculating distortion occurring in each of a plurality of pixels configuring the exfoliated picture, and outputting distortion information including the distortion and occurrence location of the distortion together with the exfoliated picture.

A further aspect of the present invention is an apparatus for generating an exfoliated picture by executing either one of sole processing and distributed processing with at least one computer to project picture data for three or more dimensions on a cylindrical projection surface and exfoliate the cylindrical projection surface on a projection plane corresponding to the cylindrical projection surface. The apparatus includes a distortion calculation means for calculating distortion occurring in each of a plurality of pixels configuring the exfoliated picture. The apparatus further includes an output means for outputting distortion information including the distortion and occurrence location of the distortion together with the exfoliated picture.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5(a) to 5(c) are explanatory diagrams showing a cylindrical projection method;

DETAILED DESCRIPTION OF THE PREFERRED EMBODIMENTS

First Embodiment

A first embodiment of the present invention will now be described with reference to FIGS. 1 to 17.

Figure 1:
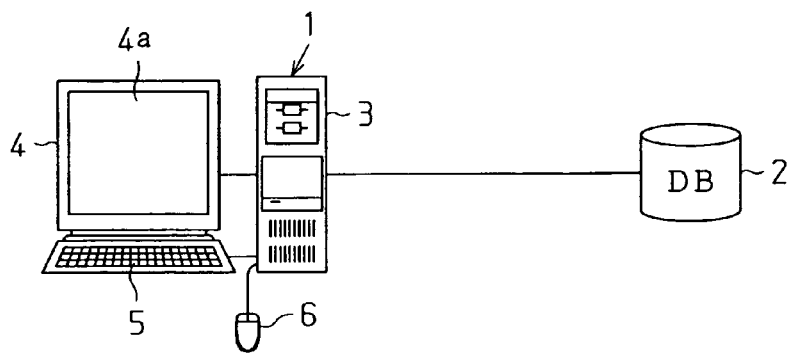
FIG. 1 is a schematic diagram of a first embodiment of an image display device.

As shown in FIG. 1, an image display device 1 reads CT picture data projected by a CT (computerized tomography) image projection device from, for example, a database, and generates and displays various types of medical diagnostic images. Although CT picture data is used in the present embodiment, the present invention is not limited to this example. That is, the picture data used is not limited to CT picture data inasmuch as data acquired by medical image processing devices, such as MRI (magnetic resonance imaging) and the like, and data including combinations of such data may be used.

The image display device 1 includes a computer (including workstation, personal computer, server etc.) 3, a monitor 4, and an input device such as a keyboard 5 and mouse 6. The computer 3 is connected to a database 2.

Figure 2:
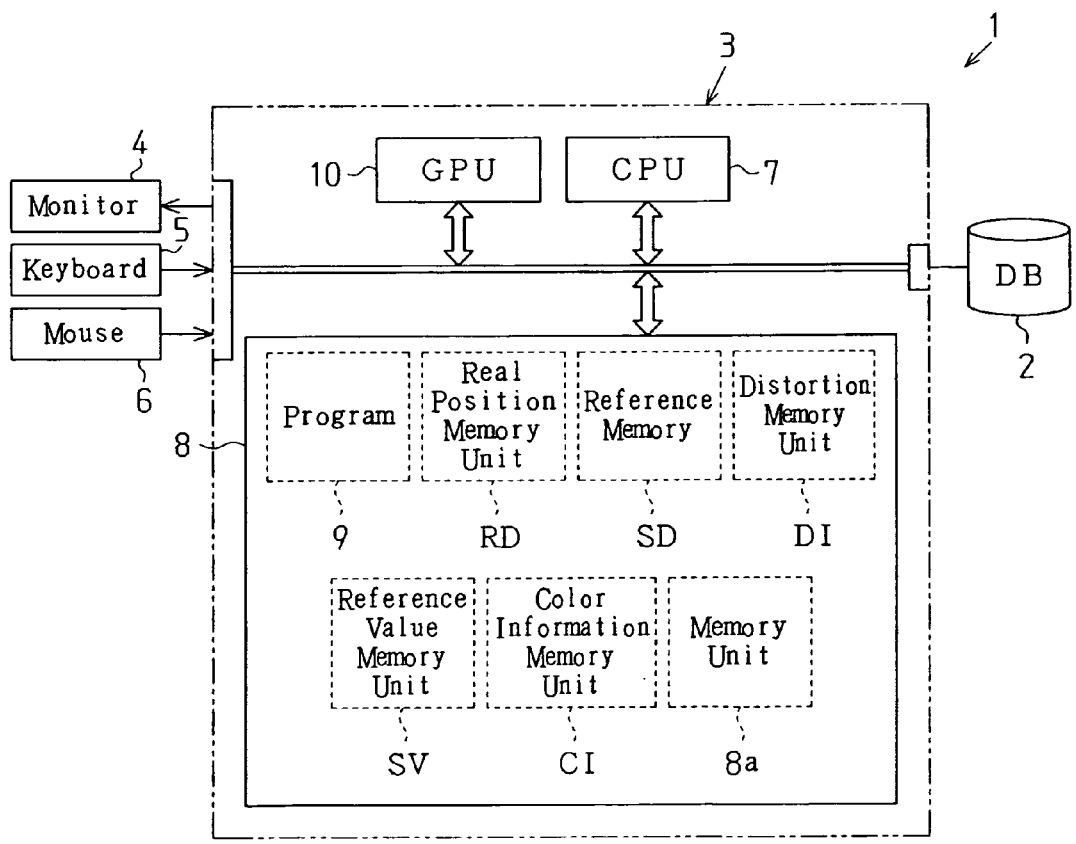
FIG. 2 is a schematic block diagram showing the structure of the image display device.
Figure 6A:
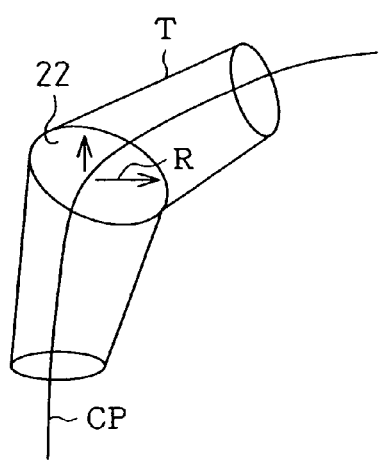
FIGS. 6(a) to 6(d) are explanatory diagrams showing an inflected cylindrical projection method.

FIG. 2 is a schematic diagram showing the structure of the image display device 1. The computer 3 includes a CPU (central processing unit) 7 and a memory 8, such as a hard disk or the like. The memory 8 stores programs (application software) for executing an exfoliated picture generating process and distortion information display process. The memory 8 incorporates a memory unit 8a for temporarily storing voxel data, obtained from CT picture data read from the database 2 or the hard disk, and recorded subvoxel data, corresponding to the voxel data. Furthermore, the memory 8a stores a center line CP representing the center of a tubular tissue T, as shown in FIG. 6(a).

The memory 8 includes a real position memory unit RD for storing the position of a virtual ray R projecting the tubular tissue T during exfoliated picture generation, and a reference position memory unit SD for storing the position of a reference virtual ray R when calculating the amount of distortion generated when the exfoliated picture is created from the tubular tissue. The memory 8 further includes a distortion memory unit DI for storing the amount of distortion occurring in each pixel configuring the exfoliated picture during generation of the exfoliated picture, and a reference value memory unit SV for storing reference values for determining the amount of distortion to be displayed as the distortion information. The memory 8 also includes a color information memory unit CI for storing information relating to the color of the virtual ray R.

Figure 14:
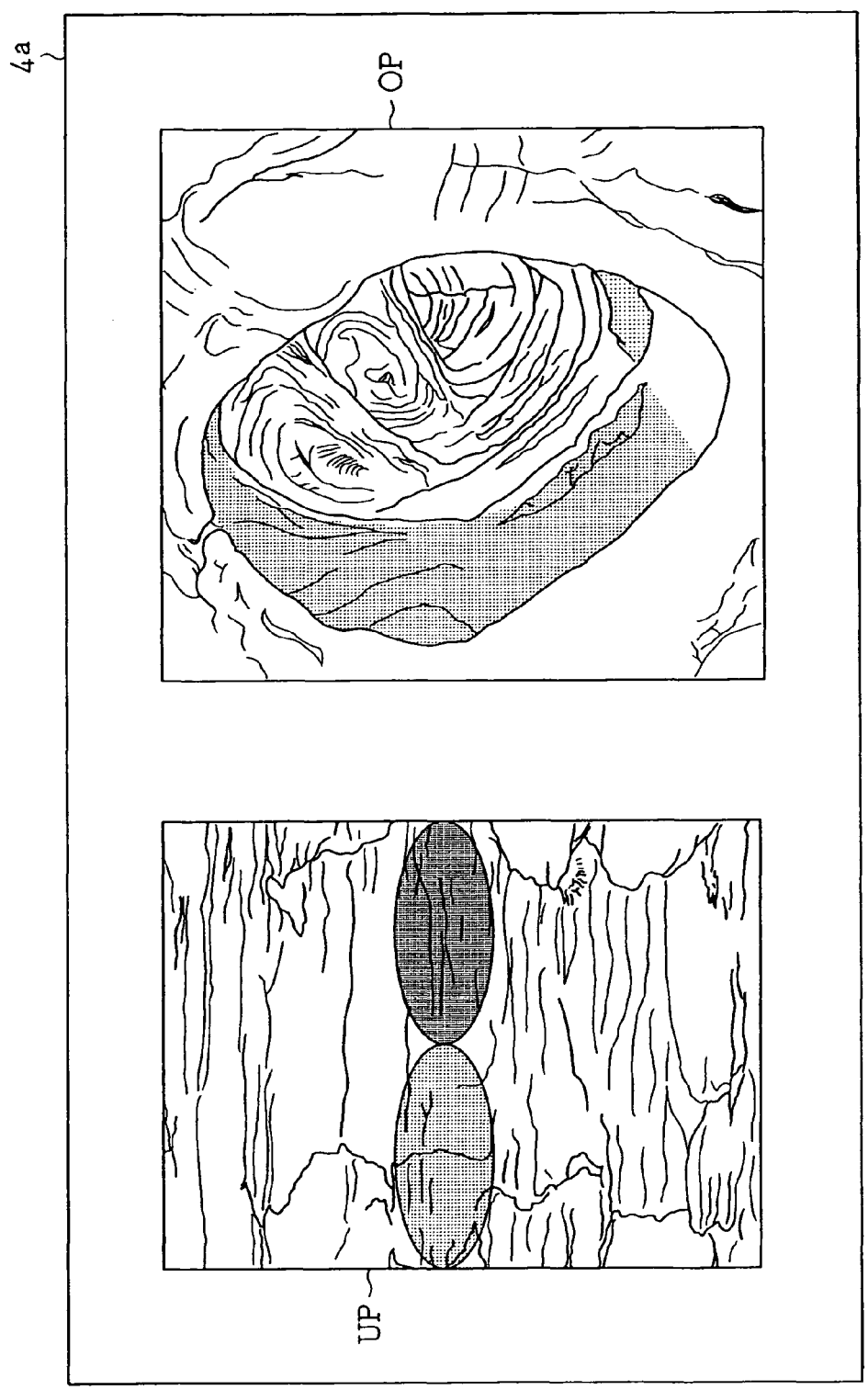
FIG. 14 is an explanatory diagram showing an exfoliated picture and perspective projective image.

The CPU 7 obtains distortion information generated when an exfoliated picture is created from tubular tissue using voxel data obtained from CT picture data acquired from the database 2 by executing a program 9, and executes the output distortion information display process. That is, in the present embodiment, the CPU 7 (computer 3) executes the exfoliated picture process program of the exfoliated picture process (distortion calculation stage, color information addition stage, exfoliated picture generation stage, distortion picture generation stage, synthesizing stage, output stage, projection picture generation stage, distortion addition stage and the like). Thus, the computer 3 functions as a distortion calculating means, color information adding means, exfoliated picture generating means, distortion picture generating means, synthesizing means, outputting means, projection picture generating means, distortion picture adding means and the like. Then, after execution of the distortion picture display process, the resulting image of the exfoliated picture UP is displayed adjacent to the perspective projection picture OP on the monitor 4 (screen 4a), as shown in FIG. 14.

The voxel data VD used as picture data for three or more dimensions are a set of voxels (a plurality of pixels in three or more dimensions), and the density values are allocated as voxel values at three-dimensional grid points. In the present embodiment, for example, the pixel value of the CT picture data, that is, the CT value, is used directly as a density value.

Since the CT picture data are a tomographic image of the body of a patient or the like, one slice is a two-dimensional, cross-sectional image of bones, blood vessels, organs and the like. However, three-dimensional picture data is configured by the entirety of a plurality of adjacent slices (cross-sections). Accordingly, CT data refers to three-dimensional picture data including a plurality of slices in the following description.

CT picture data has a CT value that differs for each tissue (bone, blood vessel, organ) of the imaged body. The CT value is an X-ray attenuated coefficient of the represented tissue based on water, such that the type of tissue or lesion can be determined by the CT value. The CT picture data includes the entire coordinate data of the sectional image (slice image) of the body subjected to a CT scan by a CT imaging device, and the positional relationship among different tissues in the direction of view (depth direction) can be determined from the coordinate data. That is, the voxel data VD provides CT values (hereinafter referred to as 'voxel values') and coordinate data.

Furthermore, the tubular tissue T, which is configured by the pixel data of three or more dimensions, is a tubular organ, such as, for example, a blood vessel, trachea, digestive tract (esophagus, stomach, small intestine, large intestine) or the like. Although the large intestine is described as an example in the present embodiment, the present invention is not limited to this example. That is, the tubular tissue is not limited to organs, such as blood vessels, trachea, alimentary canal and the like, insofar as they are tubular bodies.

An exfoliated picture UP is an image of the inner wall of tubular tissue T represented in the perspective projection picture OP projected on a two-dimensional plane, as shown in FIG. 14, and this image is generated, among volume rendering processes, by a cylindrical projective method using a cylinder coordinate system, or a similar projection method, such as, for example, an inflection cylinder projective method.

Figure 3:
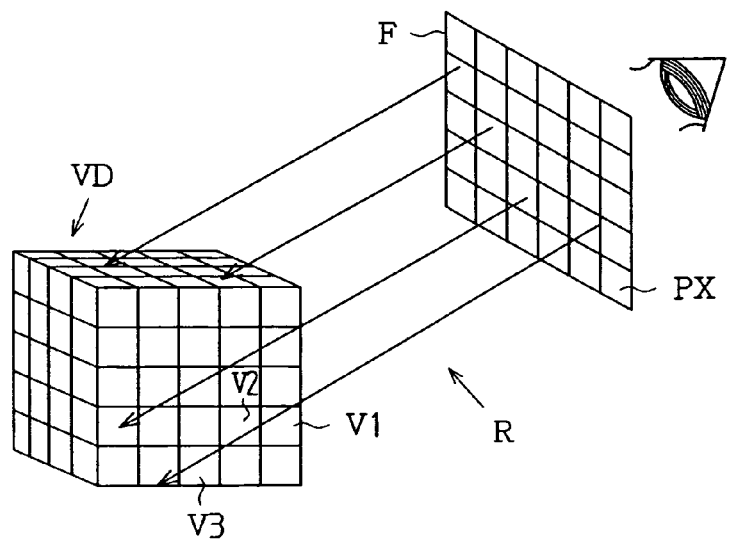
FIG. 3 is an explanatory diagram showing volume rendering.

The volume rendering process will now be described. A ray casting method is generally used in volume rendering. The ray casting method considers the ray path from the observation side (frame F side) as shown in FIG. 3, rays (virtual rays R) are projected from pixel PX on the frame F side, and reflected light is calculated at sampling positions at a fixed interval (..., V1, V2, V3, ... in FIG. 3). When the virtual ray sampling position is not on the grid, an interpolation process is performed using the voxel values of voxels surrounding the position, and the interpolated voxel value is calculated from these values.

When one virtual ray R is projected voxel data from the line of sight direction, the virtual ray R impinges the voxel data VD and is partially reflected as it sequentially passes through the voxels configuring the voxel data VD. Then, the absorbed light and reflected light is discretely calculated for each voxel, the pixel value of the image projected on the frame F is determined by calculating the reflected light, and a two-dimensional image is generated.

Figure 4:
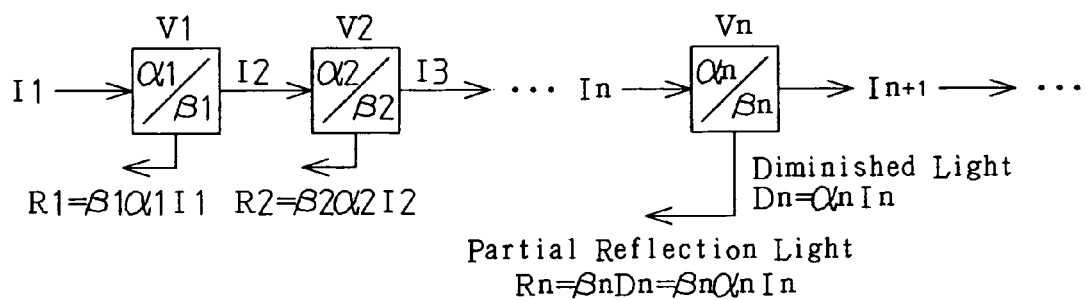
FIG. 4 is a block diagram showing volume rendering.

FIG. 4 illustrates a calculation method of the ray casting method in correspondence with the single virtual ray R in FIG. 3. The blocks shown in FIG. 4 are equivalent to voxels, and each of these voxels has an opacity value $\alpha n$ and shading coefficient $\beta n$ as property parameters of the ray. The opacity $\alpha n$ is represented by a numeric value that satisfies the expression $0 \leq \alpha n \leq 1$, and the value $(1-\alpha n)$ represents the transparency. The expression $0 < \alpha n < 1$ is opaque, $\alpha n = 0$ is transparent, and $0 < \alpha n < 1$ is semitransparent. The shading coefficient contains information relating to shading, such as color, gradient and the like.

The initial incidence ray I1 sequentially passes through each voxel, and the ray is partially reflected and partially absorbed by each voxel such that the remaining ray (transmission light) is gradually diminished. The integral value (integral reflection light) of the partial reflected ray Rn (n=1, 2, ...) in each voxel is equivalent to the brightness of the pixel PX on the frame F side. Since the diminished light Dn (n=1, 2, ...) is represented by the equation Dn=$\alpha n$In using the incidence ray In of the nth voxel, the partial reflection light Rn can be represented by the equation Rn=$\beta n$Dn=$\beta n \alpha n$In. The equation In+1=$(1-\alpha n)$In can be established from the relationship of the incidence ray and remaining ray (transmission light) in each voxel. Thus, the pixel value Pv of the integral reflection light can be expressed by the following equation.

$$Pv = \beta 1 \alpha 1 I1 + \beta 2 \alpha 2 I2 + \ldots + \beta n \alpha n In = \Sigma \beta n \alpha n In$$

The relationship of the opacity an to each voxel value is determined beforehand, and the opacity an is obtained from the voxel value based on the relationship information. For example, when the a volume rendering image of the large intestine is desired, the large intestine can be displayed by associating the opacity [1] with the voxel values corresponding to the large intestine, and associating opacity [0] with other voxel values.

FIGS. 5(a), 5(b), and 5(c) illustrate a process for generating an exfoliated picture UP of tubular tissue T in the cylindrical projection method using voxel data.

The cylindrical projection method assumes a cylindrical coordinate system, and assumes viewpoints continuously distributed on the center axis 14 (direction perpendicular to the drawing surface) of a cylindrical projection surface 12 (refer to FIG. 5(b)) having a predetermined radius arranged around a projection object 11. From these viewpoints the virtual rays R radiate within a plane 13 that intersects the center axis of the cylindrical projection surface within the projection object 11, and the projection object is projected on the cylindrical projection surface 12, as shown in FIG. 5(b). Then, the projection picture projected on the cylindrical projection surface 12 is subjected to coordinate conversion to the two-dimensional plane 16 as the projection plane shown in FIG. 5(c) to obtain the exfoliated picture representing the interior part of the tubular tissue T, as shown in FIG. 14.

Since the tubular tissue T is generally curved, parts of the curved tubular tissue T may mutually overlap when projected on a cylindrical projection surface. This method of projecting the tubular tissue T is the inflected cylindrical projection method.

Figure 6B:
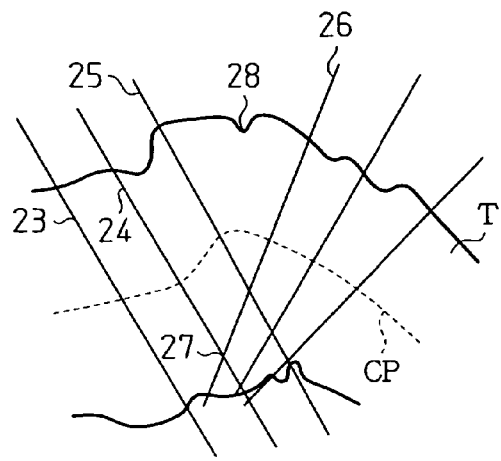
Figure 6C:
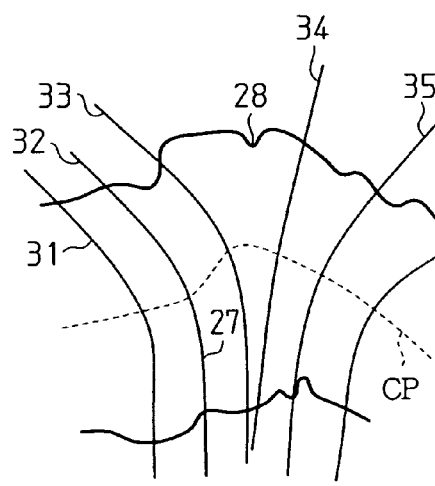

FIGS. 6(a), 6(b), and 6(c) illustrate the process for generating an exfoliated picture UP of tubular tissue T in the inflected cylindrical projection method using voxel data.

The inflected cylindrical projection method is part of the cylindrical projection method, and first assumes a central path CP along the center of the tubular tissue T as a tubular body, as shown in FIG. 6(a). Then, viewpoints continuously distributed on the central path CP are assumed. Next, virtual rays R radiate from the viewpoints within a plane 22 intersecting the central path CP, and a projection object is projected on a cylindrical plane (not shown), which covers the exterior of the projection object. Then, the projection picture projected on the cylindrical plane is subjected to coordinate conversion to a two-dimensional plane to obtain the exfoliated picture UP representing the interior of the tubular tissue T as if sliced from the cylindrical projection surface. In this way, the central path CP is curved to match the inflection of the tubular tissue T, and the distance between the planes intersecting the central path CP is reduced such that an exfoliated picture UP projected on a two-dimensional plane can be obtained from the curved tubular tissue T.

In the inflected cylindrical projection method, when the tubular tissue T has a large curvature, the planes 23, 24, and 25, which intersect the central path CP, intersect the plane 26, as shown in FIG. 6(b). As a result, in the interior wall surface of the tubular tissue T, there are parts displayed a plurality of times in the exfoliated picture UP and parts that are lost. For example, the polyp 27 is displayed twice on the exfoliated picture UP because it is projected in plane 24 and plane 26, as shown in FIG. 6(b). Furthermore, since the polyp 28 is not in an intersecting plane, it is not even displayed once on the exfoliated picture UP despite the presence of the polyp 28 in the tubular tissue T. To avoid this situation, nonlinear ray casting can be performed.

In the inflected cylindrical projection method, nonlinear ray casting radiates virtual rays R on curving planes 31 to 36 that are orthogonal to the central path CP in the neighborhood of the central path CP, as shown in FIG. 6(c). That is, nonlinear virtual rays R radiate from the central path CP. In this way, the polyp 27 is displayed only once in the exfoliated picture UP since the polyp 27 is only projected by one plane, as shown in FIG. 6(c). Furthermore, the polyp 28 is projected on the exfoliated picture UP by increasing the number of planes that intersect the central path CP.

Figure 6D:
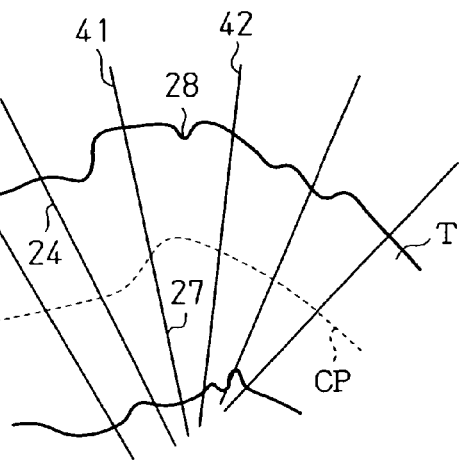

Furthermore, even when nonlinear ray casting is not performed and the virtual rays R are linear, the intervals of the radiating linear virtual rays R are corrected by correcting the position of the plane 25 to the position of plane 41 and correcting the position of plane 26 to the position of plane 42, and preventing mutual intersections of the planes 23 to 26, as shown in FIG. 6(d), such that the displaying of the polyp 27 for multiple times is avoided.

Thus, even a curved tubular tissue T can be projected on a two-dimensional plane 16 by projecting the virtual rays R from the central path CP along the tubular tissue T using the inflected cylindrical projection method, although the virtual rays R generate distortion when displayed due to the inflection relative to the square shape of the pixels that, in their plurality, configure the two-dimensional plane 16. That is, since the expanded side of the outer inflected part and the compressed side of the inner inflected part are projected to pixels having the same area, the inner side of the inflected part is expanded while the outer side of the inflected part is compressed, and distortion is generated. Furthermore, distortion is produced by correcting the virtual rays R when nonlinear ray casting has been performed as shown in FIG. 6(c), or when the intervals of the radiating virtual rays R are corrected as shown in FIG. 6(d). That is, display distortion is generated relative to the squareness of the pixels configuring the two-dimensional plane 16 on which the projection object 11 is projected since virtual rays R radiate at intervals that differ from the length of the square pixel edges, or nonlinear rays R are radiated.

As for distortion generated by the curvature of the tubular tissue T, it can be predicted whether or not distortion will occur by, for example, simultaneously observing the exfoliated picture and parallel projection picture, and determining whether or not the location displayed as the exfoliated picture is curved. However, when nonlinear ray casting has been performed as shown in FIG. 6(c) and when the intervals of the radiating virtual rays R have been corrected as shown in FIG. 6(d), the presence of distortion cannot be determined because whether or not the virtual rays R have been corrected on the exfoliated picture and whether or not the rays R are nonlinear is not displayed. Therefore, the existence or absence of distortion can be intuitively understood by displaying the distortion caused by the correction of the virtual rays R as distortion information on the exfoliated picture. Furthermore, the existence or absence of distortion can be intuitively understood by the exfoliated picture alone without, for example, visual comparison with a parallel projection picture by displaying the distortion generated by the curvature of the tubular tissue T in the exfoliated picture.

In this state, the tubular tissue T itself is not distorted, and the set of square pixels of the two-dimensional plane 16 is not distorted. That is, since the curved body is projected on square pixels, the virtual rays R are not projected at equal intervals, and distortion is virtually generated by projecting the rays at different intervals, such that this virtual distortion is displayed as distortion information together with the exfoliated picture in the present embodiment.

Figure 7:
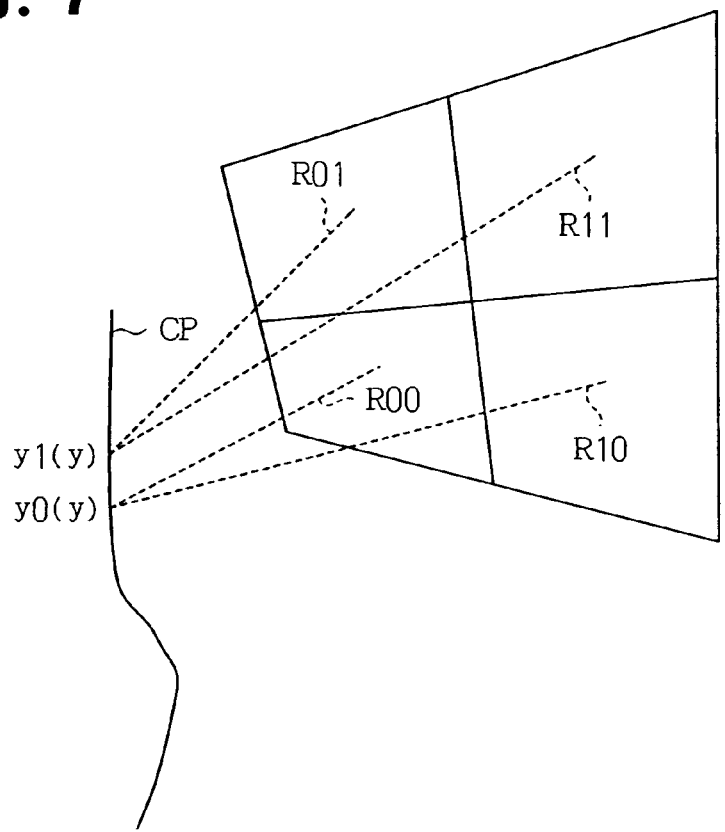
FIG. 7 is a schematic diagram showing distortion information.

The distortion information includes X-direction interval distortion $d\theta$, Y-direction interval distortion $dy$, X-direction shear distortion $dsx$, Y-direction shear distortion $dsy$, and area distortion $dA$. The distortion information is visualized by calculating and visualizing the shift in the positions of the respective virtual rays R radiating from the central path CP as amounts of distortion. More specifically, when calculating the distortion information, attention is focused on one of the virtual rays R and that virtual ray R is designated as virtual ray R00, as shown in FIG. 7. The virtual rays R adjacent to the virtual ray R00 are designated as adjacent virtual rays R01, R11, R10 and used for calculations. Then, the plurality of virtual rays R radiating from the central path CP are expressed in terms of projection angle $\theta$ in the radius direction of the tubular tissue T (refer to FIG. 11), projection angle $\phi$ in the center axis direction (refer to FIG. 8), and viewpoint position y as the projection position (refer to FIG. 7). For example, the projection angle $\theta$ of the virtual ray R00 is expressed as R00$\theta$, projection angle $\phi$ is expressed as R00$\phi$, and viewpoint position y is expressed as R00$y$. Furthermore, assuming that the tubular tissue T is not curved and the central path CP is straight, the projection angle of the virtual rays R projected from the central path CP (straight line central path) in the radius direction of the tubular tissue T is set as a first reference projection angle $\theta 0$. Similarly, the projection angle $\phi$ of the virtual rays R projected from the central path CP in the axis direction of the tubular tissue T is set as a second reference projection angle $\phi 0$. The distance on the central path CP (projection interval) of each virtual ray R projected from the central path CP (straight line central path) to the tubular tissue T is set as the Y-direction reference distance $y0$. In the present embodiment, the first reference projection angle $\theta 0$, second reference projection angle $\phi 0$, and reference distance $y0$ are recorded beforehand in the reference position memory unit SD.

Figure 8:
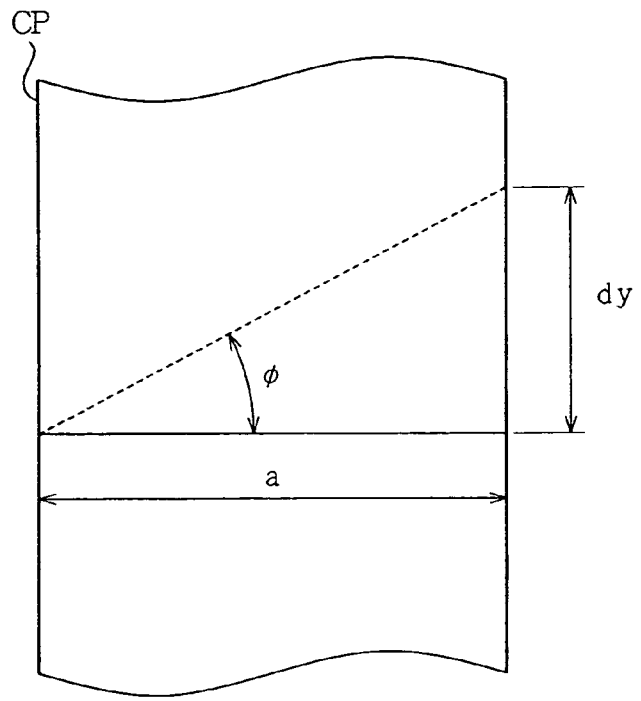
FIG. 8 is a schematic diagram showing distortion information.

The first real projection angle, defined as difference in projection angles $\theta$ between two virtual rays R actually adjacently projected in a X-direction along the path perpendicular to the central path, is recorded in the real position memory unit RD, and the difference between the first real projection angle and the first reference projection angle $\theta 0$ is expressed as the distortion $d\theta$ (=R10$\theta$−R00$\theta$−$\theta 0$). Furthermore, the real viewpoint position, defined as difference in viewpoint position y between two virtual rays R actually adjacently projected in a Y-direction along the central path, is recorded in the real position memory unit RD. Similarly, the second real projection angle defined as difference in projection angle $\phi$ between adjacent virtual rays R is recorded in the real position memory unit RD. Then, the difference between the real viewpoint position and the reference distance y0, and the difference between the second real projection angle and the second reference projection angle $\phi 0$ can be expressed as the Y-direction interval distortion dy=d$\phi$ (=R01y−R00y−y0+a× (R01$\phi$−R00$\phi$)). As shown in FIG. 8, "a" represents a cylinder radius constant for assuming the radius of the tubular tissue T. That is, the Y-direction interval distortion dy is generated not only by the shift (=R01y−R00y) of the viewpoint y on the central path CP, but also by the shift (=R01$\phi$−R00$\phi$) of the projection angle $\phi$ in the center axis direction. In this state, since the distance (Y-direction interval distortion dy) corresponding to the shift of the projection angle $\phi$ in the exfoliated picture UP changes in accordance with the radius of the tubular tissue T, the cylinder radius constant "a" is determined for the convenience of calculating the Y-direction interval distortion dy.

Figure 9:
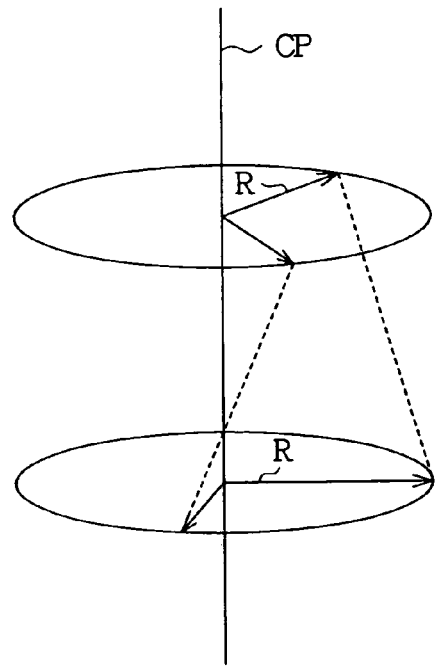
FIG. 9 is a schematic diagram showing distortion information.
Figure 10:
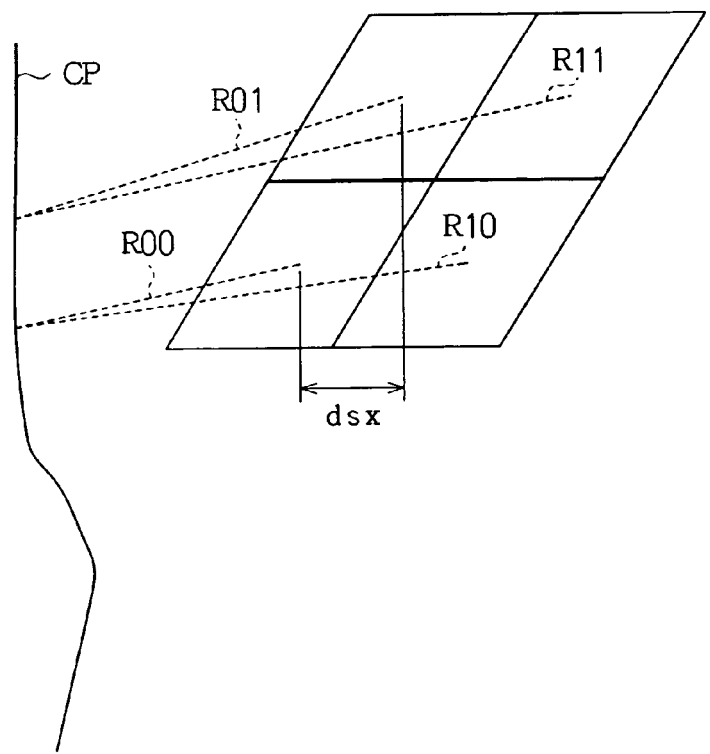
FIG. 10 is a schematic diagram showing distortion information.
Figure 11:
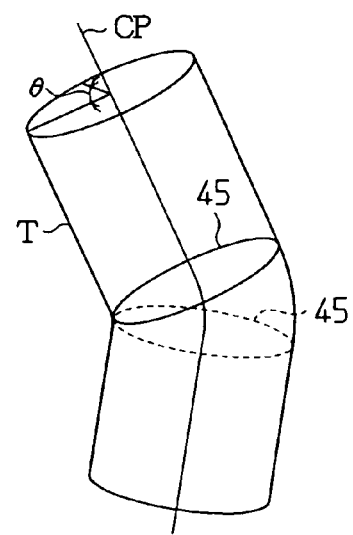
FIG. 11 is a schematic diagram showing distortion information.
Figure 12:
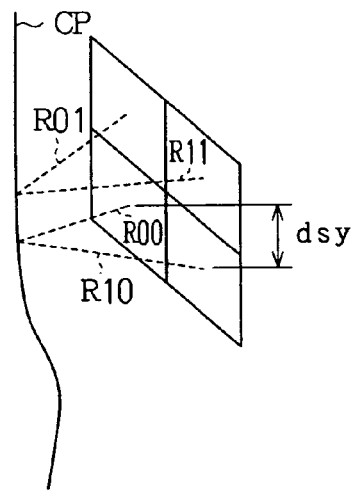
FIG. 12 is a schematic diagram showing distortion information.
Figure 13:
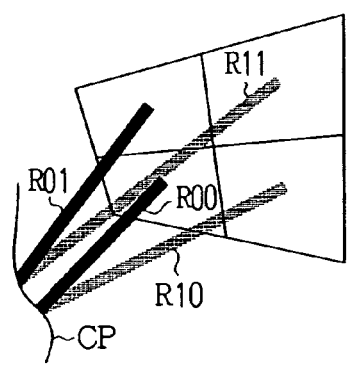
FIG. 13 is a schematic diagram showing distortion information.

The X-direction shear distortion dsx is produced when the tubular tissue T is twisted and the virtual rays R that are adjacent in the Y-direction are projected in different projection directions, as shown in FIG. 9. To facilitate description, the tubular tissue T is not shown in FIG. 9, and only the plane in which the virtual rays R are projected is shown. As shown in FIG. 10, the difference in the projection angle $\theta$ of adjacent virtual rays R in the Y-direction can be expressed as the X-direction shear distortion dsx (=R01$\theta$−R00$\theta$). The Y-direction shear distortion dsy is produced by the adjustment of the projection angle $\theta$ in the curved part of the tubular tissue T. That is, in the curved part of the tubular tissue T, when the plane including the virtual rays R radiating from the central path CP mutually overlap and intersect the central path CP, the angle of the plane 45 is adjusted from the angle indicated by the broken line to the angle represented by the solid line. The difference in the projection angle $\theta$ of adjacent virtual rays R in the X-direction generated by the adjustment of this plane can be expressed as the Y-direction shear distortion dsy (=R10$\phi$−R00$\phi$), as shown in FIG. 12. The distortion expressed as a change in the aspect ratio of each pixel when displayed on the exfoliated picture UP can be expressed as the area distortion dA (=d$\theta$×dy). The total distortion including X-direction interval distortion d$\theta$, Y-direction interval distortion dy, X-direction shear distortion dsx, Y-direction shear distortion dsy, and area distortion dA is designated as distortion amount DQ, and the distortion amounts DQ corresponding to a plurality of virtual rays R radiating calculated by the CPU 7 are respectively recorded in the distortion amount memory unit DI.

In the present embodiment, among the distortion amounts DQ expressed as described above, the distortion amount exceeding a fixed amount is displayed as distortion information. More specifically, among the distortion amounts DQ, the distortion amounts DQ that exceed the first reference value S1, which is a predetermined reference value recorded in the reference value memory unit SV, is displayed as distortions taking negative values, that is, distortions in the compression direction. Among the distortion amounts DQ, the distortion amounts DQ that exceed the second reference value S2, which is a predetermined reference value recorded in the reference value memory unit SV, is displayed as distortions taking positive values, that is, distortions in the expansion direction.

The distortion information may allow a location corresponding to the distortion of the generated exfoliated picture data D1 to have color added according to the color of the virtual rays R by having different colors of the projected virtual rays R projected when generating the exfoliated picture data D1 in accordance with the distortion amount DQ. More specifically, when the distortion amounts DQ corresponding to the virtual rays R01 and R00 exceeds the first reference value S1, the color of the virtual rays R01 and R00 is set to dark gray. When the distortion amount DQ of the virtual rays R11 and R10 exceed the second reference value S2, the color of the virtual rays R11 and R10 is set to light gray. When the distortion amount DQ is less than the first and second reference values S1 and S2, the color of the virtual rats R remains in the initial condition regardless of whether or not the location has generated distortion. In this way, the locations at which the distortion amount DQ exceeds the first or second reference values S1 and S2 are colored with light gray or dark gray, and locations at which the distortion amount DQ does not exceed the first and second reference values S1 and S2 are displayed in the color of the tubular tissue. The color of these virtual rays R is recorded as color information in the color information memory unit CI.

Then, all of the pixels configuring the two-dimensional plane 16 (refer to FIG. 5) are subjected to similar calculation of their distortion amount DQ, determinations are made of the color of the virtual rays R projected on pixels for which the distortion amount DQ exceeds the first or second reference values S1 and S2, and these determined virtual rays R are projected on the tubular tissue T to generate the exfoliated picture data D1. When generating the perspective projective picture data D2, distortion information can be displayed on the perspective projective picture data D2 corresponding to the same tubular tissue T by projecting the virtual rays R that are colored in accordance with the same distortion information as when the exfoliated picture data D1 is generated.

More specifically, when generating the perspective projective picture data D2, a recording subvoxel data VDR that corresponds to the voxel data VD is generated. In the present embodiment, the subvoxel data VDR is a set of the same voxels as the voxel data VD, and the same voxel values as the voxels configuring the voxel data VD are allocated to these voxels. When calculating the distortion amount DQ through the cylindrical projection method, the distortion amounts DQ are recorded in the voxels of the subvoxel data VDR corresponding to the voxels of the voxel data VD, through which the virtual rays R pass. When performing rendering in the cylindrical projection method, the distortion amount DQ is read from the voxels of the subvoxel data VDR corresponding to the voxels of the voxel data VD through which the virtual rays R pass. Then, by reflecting the read distortion amount DQ in the calculation of the virtual rays R in the rendering performed in the perspective projective method, distortion information identical to the distortion information added to the exfoliated picture data D1 are added to the perspective projective picture data D2 corresponding to the tubular tissue T that generated the exfoliated picture data D1

As shown in FIG. 2, the computer 3 is provided with a GPU (graphics processing unit) 10. The GPU 10 is a graphics controller chip mainly supporting three-dimensional high-speed graphics functions and functions to speed the drawing of three-dimensional graphics based on programs employed by the user. In the present embodiment, post processing is executed by the GPU 10. Thus, the time required to display the distortion information is reduced.

Post processing corrects the color, contrast, and brightness of the calculated distortion information for display on an output device such as the monitor 4. Specifically, since the output (CT image, MRI image and the like) of many medical imaging devices is 12-bit gradient data, the unfolding picture UP that includes the distortion information calculated by the exfoliated picture process is also 12-bit gradient data, while the monitor 4 of the computer 3 often displays images that express RGB in 8-bits. Therefore, WL transformation (window level transformation) and LUT transformation (color look-up table transformation) is performed to transform the color, contrast, and brightness so as to be displayable on the monitor 4. Affine transformation is also performed to match the size of the screen such that the transformation can be displayed on the monitor 4.

The operation of the distortion information display process will now be described.

Figure 15:
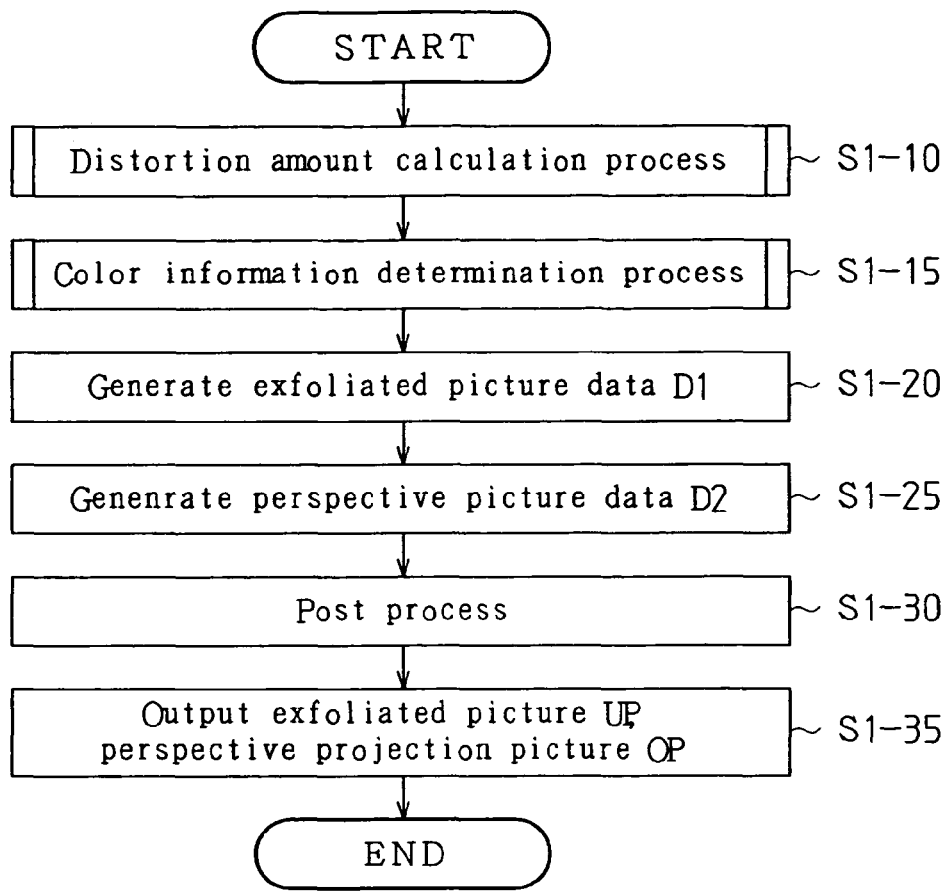
FIG. 15 is a flowchart showing an exfoliated picture process.

FIG. 15 is a flowchart of the overall distortion information display process.

Figure 16:
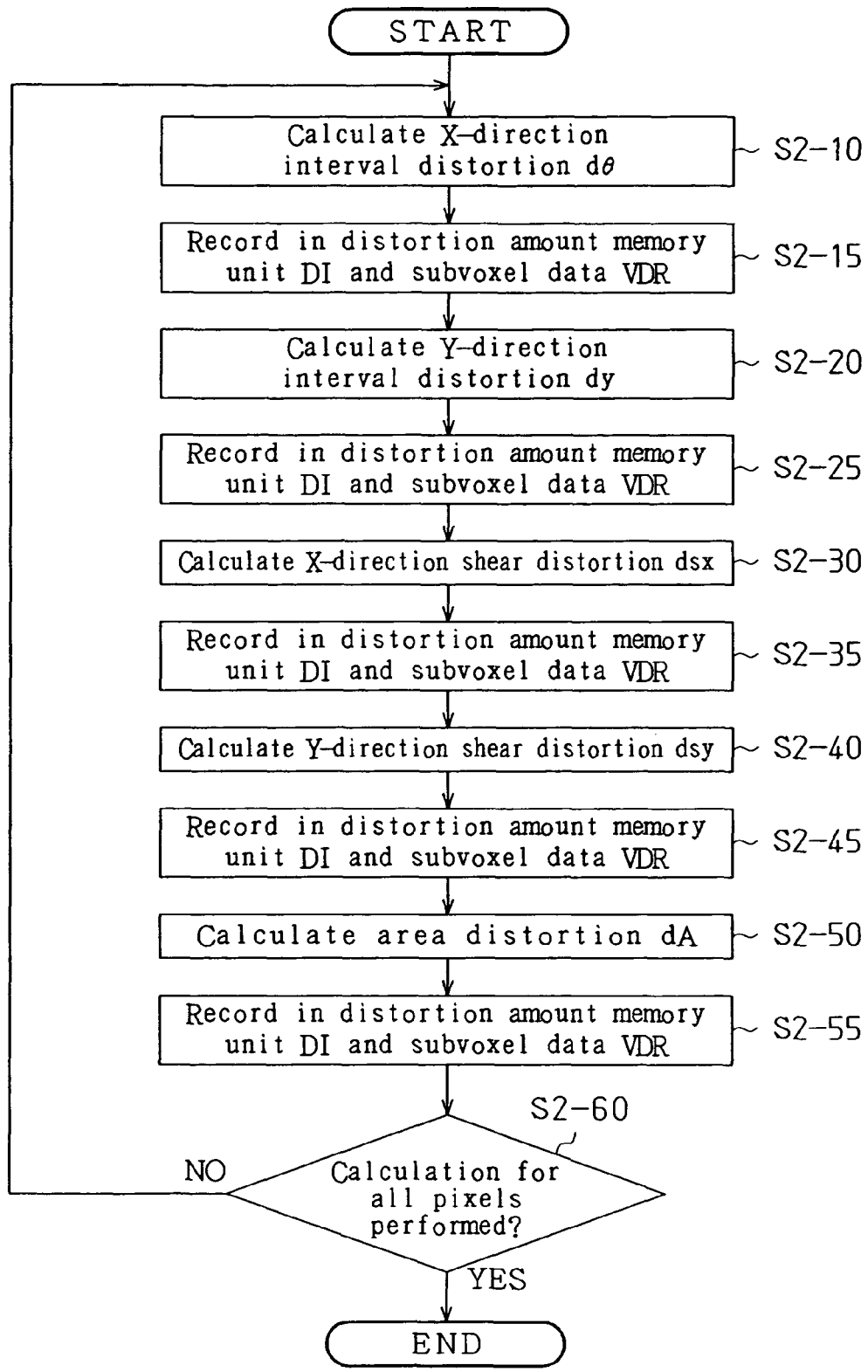
FIG. 16 is a flowchart showing a distortion amount calculation process.

The CPU 7 first performs the distortion amount calculation process (step S1-10). The distortion amount calculation process is executed as shown in FIG. 16. The CPU 7 calculates the X-direction interval distortion dθ (step S2-10). That is, the CPU 7 reads the first reference projection angle θ0 from the reference position memory unit SD, reads the first real projection angle from the real position memory unit RD, calculates the difference between the two angles, and records the result as the X-direction interval distortion dθ in the distortion amount memory unit DI and subvoxel data VDR (step S2-15). Then, the CPU 7 similarly calculates the Y-direction interval distortion dy (step S2-20). That is, the CPU 7 reads the reference distance y0 from the reference position memory unit SD, reads the real viewpoint position from the real position memory unit RD, and calculates the difference between the two values. The CPU 7 then reads the second reference projection angle φ0 from the reference position memory unit SD, reads the second real projection angle from the real position memory unit RD, and calculates the difference. Then, this difference is recorded as the Y-direction interval distortion dy in the distortion amount memory unit DI and the subvoxel data VDR (step S2-25). The CPU 7 then calculates the X-direction shear distortion dsx (step S2-30). That is, the CPU 7 calculates the difference in the projection angle θ of the adjacent virtual rays R in the Y-direction, and records the difference in the distortion amount memory unit DI and the subvoxel data VDR (step S2-35). The CPU 7 calculates the Y-direction shear distortion dsy (step S2-40). That is, the CPU 7 calculates the difference in the projection angle φ of the adjacent virtual rays R in the X-direction, and records the difference in the distortion amount memory unit DI and the subvoxel data VDR (step S2-45). Then, the CPU 7 calculates the area distortion dA (step S2-50). That is, the CPU 7 reads the X-direction interval distortion dθ and Y-direction interval distortion dy from the distortion amount memory unit DI, calculates the area distortion dA, and records the area distortion dA to the distortion amount memory unit DI and subvoxel data VDR (step S2-55).

When the X-direction interval distortion dθ, Y-direction interval distortion dy, X-direction shear distortion dsx, Y-direction shear distortion dsy, and area distortion dA (distortion amount DQ) are calculated, the CPU 7 determines whether or not the distortion amount DQ has been calculated for all of the pixels configuring the two-dimensional plane 16. When calculation has not been performed for all of the pixels (step S2-60: NO), the CPU 7 repeats the calculation of the distortion amount DQ for the next pixel (step S2-10~step S2-55). When the calculation has been performed for all of the pixels (step S2-60: YES), the CPU 7 ends the distortion amount calculation process.

Figure 17:
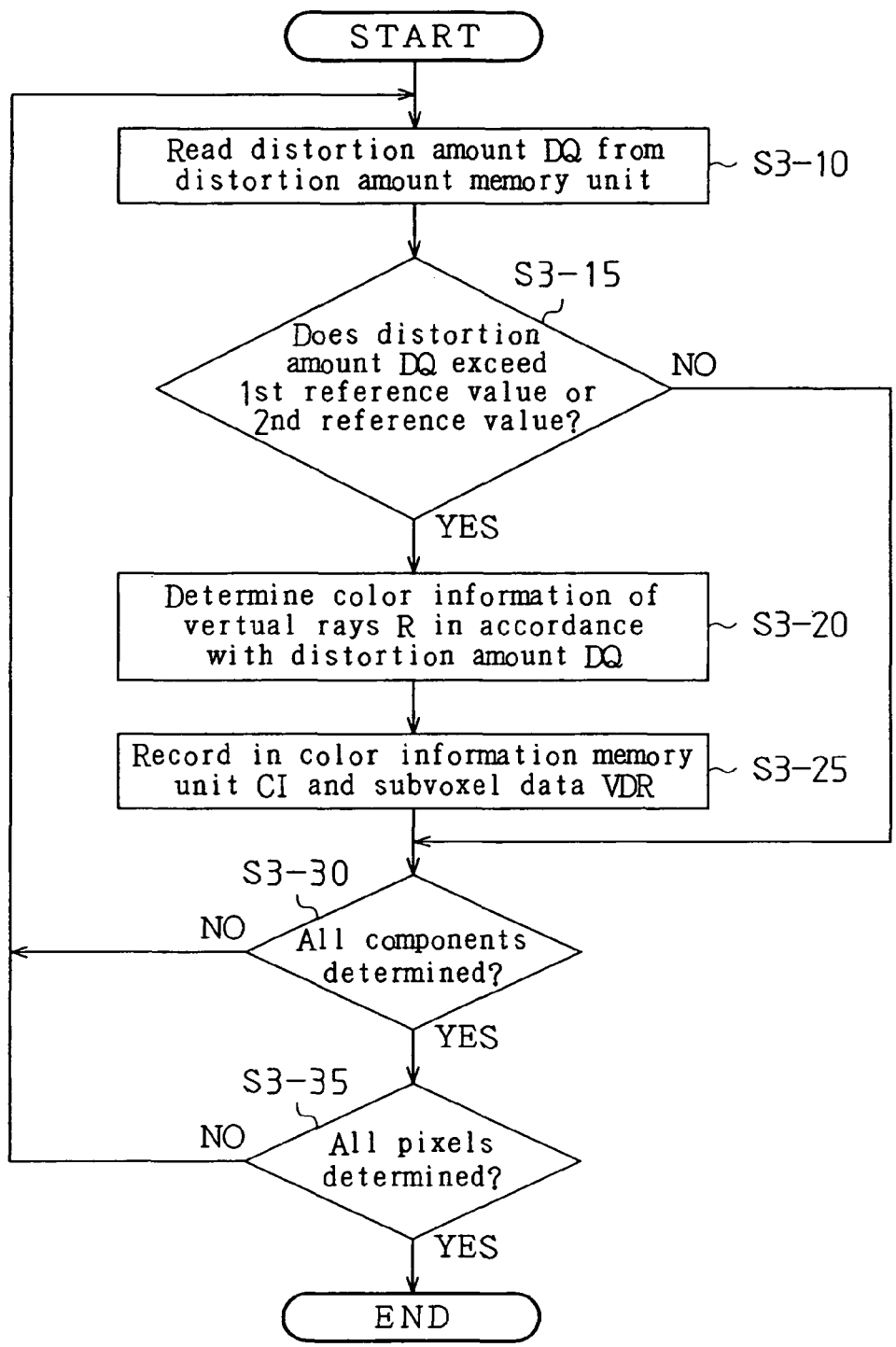
FIG. 17 is a flowchart showing a color information determination process.

When the distortion amount calculation process ends, the CPU 7 executes the color information determination process as shown in FIG. 15 (step S1-15). The color information determination process is executed as shown in FIG. 17. The CPU 7 first reads the X-direction interval distortion dθ among the distortion amounts DQ calculated by the distortion amount calculation process from the distortion amount memory unit DI (step S3-10) and determines whether or not the X-direction interval distortion dθ for each pixel exceeds the first reference value S1 or second reference value S2 (step S3-15). When it is determined that the X-direction interval distortion dθ exceeds the first reference value S1 or second reference value S2 (step S3-15: YES), the CPU 7 determines the color information of the virtual rays R (step S3-20). That is, when the X-direction interval distortion dθ exceeds the first reference value S1 or second reference value S2, the color information of the virtual ray R is determined. More specifically, the CPU 7, for example, sets the color of the virtual rays R to dark gray when the X-direction interval distortion dθ exceeds the first reference value S1. Similarly, for example, the color of the virtual rays R is set to light gray when the X-direction interval distortion dθ exceeds the second reference value S2. Thus, when the color information of the virtual rays R is determined in accordance with the distortion amount DQ, the CPU 7 records the color information in the color information memory unit CI and the subvoxel data VDR (step S3-25). However, when it is determined that the X-direction interval distortion dθ does not exceed the first reference value S1 or second reference value S2 (step S3-15: NO), the color of the virtual rays R is set to white. Then, the CPU 7 determines whether or not the virtual ray R color information has been determined for all components (X-direction interval distortion dθ, Y-direction interval distortion dy, X-direction shear distortion dsx, Y-direction shear distortion dsy, area distortion dA) of the distortion amount DQ (step S3-30).

That is, a determination is made as to whether or not color information of the virtual rays R has been determined not only for the X-direction interval distortion dθ, but also for Y-direction interval distortion dy, X-direction shear distortion dsx, Y-direction shear distortion dsy, and area distortion dA. When the virtual ray R color information has not been determined for all components of the distortion amount DQ (step S3-30: NO), the CPU 7 reads the other components of the distortion amount DQ from the distortion amount memory unit DI and determines the color information of the virtual rays R (step S3-10~step S3-25). However, when the virtual ray R color information has been determined for all components of the distortion amount DQ (step S3-30: YES), the CPU 7 determines whether or not the color information of the virtual rays R has been determined for all pixels configuring the two-dimensional plane 16 (step S3-35). When color information of the virtual rays R has not been determined for all pixels (step S3-35: NO), the CPU 7 reads the distortion amount DQ for the next pixels from the distortion amount memory unit DI and determines the color information of the virtual rays R (step S3-10~step S3-25). When color information of the virtual rays R has been determined for all pixels (step S3-35: YES), the CPU 7 ends the color information determination process for the virtual rays R.

When the color information determination process ends for the virtual rays R (step S1-15 in FIG. 15), the exfoliated picture data Dl is generated (step S1-20). That is, the CPU 7 projects the virtual rays R with color information determined in the color information determination process on the voxel data VD and generates the exfoliated picture data D1. Since, in the present embodiment, the exfoliated picture data D1 is generated by known methods, with the exception of the exfoliated picture data D1 generated by projecting the virtual rays R with the color information determined in the color information determination process, detailed description of the generation is omitted. Next, the CPU 7 generates the perspective projective picture data D2 (step S1-25). That is, the CPU 7 reads the distortion amount DQ recorded in the subvoxel VR corresponding to the voxel V through which the virtual ray R passes, and in the case of rendering by perspective projective method, generates perspective projective picture data D2 to which the distortion amount DQ is added. The addition of the distortion amount DQ can be accomplished, for example, by adding coloration according to the distortion amount to the color of the voxel through which the virtual ray R passes. Since, in the present embodiment, the perspective projective picture data D2 are generated by known methods, with the exception of the generation of the perspective projective picture data D2 to which the distortion amount DQ is added, detailed description of the generation is omitted.

When the exfoliated picture data D1 and the perspective projective picture data D2 are generated, the GPU 10 performs post processing and generates exfoliated picture UP and a perspective projection picture OP (step S1-30). When post processing ends, the exfoliated picture UP and perspective projection picture OP are output side by side on the screen 4*a* of the monitor 4 (step S1-35). Since color is added as color information to the exfoliated picture UP and perspective projection picture OP in accordance with the distortion amount DQ at locations with distortion after the exfoliated picture process ends, the inner wall surface of the tubular tissue T is easily observable, and an exfoliated picture UP and perspective projection picture OP can be obtained that represent the distortion produced when generating the exfoliated picture UP of the tubular tissue T.

That is, the attention of the observer can be focused and the observer can intuitively understand the distorted locations since the distorted locations are colored on the exfoliated picture UP. Since the perspective projection picture OP is similarly colored, an observer can intuitively grasp the position of the generated distortion in the tubular tissue T. Whether this distortion is generated by compression or expansion when the exfoliated picture is generated can be intuitively understood by the coloration. Accordingly, more accurate diagnosis is possible by closely observing the colored areas.

The first embodiment has the advantages described below.

(1) In the first embodiment, an exfoliated picture UP containing distortion information is generated. As a result, the locations at which distortion is generated in the exfoliated picture UP can be intuitively understood, for example, by an observer, and more accurate diagnosis can be achieved since polyps will not be inadvertently identified or overlooked on the intestinal wall due to distortion.

(2) In the first embodiment, the exfoliated picture UP and colored distortion information are generated together. As a result, the locations at which distortion is generated can be intuitively understood, and the attention of the observer is focused on these locations in real time. Therefore, diagnosis is more accurate.

(3) In the first embodiment, distortion information identical to the distortion information added to the exfoliated picture UP is added to the perspective projection picture OP, and the exfoliated picture UP and perspective projection picture OP are displayed side by side on the screen 4*a* of the monitor 4. As a result, more accurate diagnosis is possible since diagnosis is made while visually comparing the locations at which distortion is generated in both the exfoliated picture UP and perspective projection picture OP.

(4) In the first embodiment, the distortion amount DQ is determined in accordance with difference in position and angle between the virtual rays R when the exfoliated picture UP is generated and the virtual rays R serving as a reference, color is added in accordance with the distortion amount DQ of the virtual ray R, and the colored virtual rays R are projected to generate the exfoliated picture UP. As a result, the amount of distortion DQ can be determined without complex calculations. Therefore, distortion information can be displayed in real time.

(5) In the first embodiment, the virtual rays R are colored according to the distortion amount DQ, and an exfoliated picture UP is generated by projecting the colored virtual rays R. As a result, for example, in contrast to a technique where a layer representing the distortion information is provided and displayed overlapped with the exfoliated picture UP, even when the observation object has undulations and the generated exfoliated picture UP has undulations, the distortion amount DQ does not look dissociated from the exfoliated picture UP when the line of sight for viewing the exfoliated picture UP changes. Therefore, distortion information can be accurately understood regardless of the type of the tubular tissue T.

(6) In the first embodiment, the virtual rays R are colored according to the distortion amount DQ, and a perspective projection picture OP is generated by projecting the colored virtual rays R. As a result, for example, the distortion information in the perspective projection picture OP can be displayed by the simple process of projecting the virtual rays R compared to when the distortion amount DQ in the perspective projection picture OP is recalculated and displayed as distortion information. Therefore, perspective projection picture OP with added distortion information can be displayed in real time.

(7) In the first embodiment, the distortion amount DQ is displayed as distortion information only when the distortion amount DQ exceeds either the first reference value S1 or second reference value S2. As a result, the attention of the observer is even more focused since only the distortion information of locations requiring attention are displayed.

(8) In the first embodiment, the distortion amount DQ is displayed as distortion information only when the distortion amount DQ exceeds either the first reference value S1 or second reference value S2. As a result, observation of the exfoliated picture UP is not impaired even when the distortion information is displayed. As a further result, distortion information aids the observation of the exfoliated picture UP.

(9) In the first embodiment, distortion information is colored in accordance with the distortion amount DQ. As a result, observation of the exfoliated picture UP is not impaired by the distortion information compared to when, for example, indicators corresponding to the distortion amount DQ are displayed as distortion information together with the exfoliated picture UP. Therefore, the attention of the observer can be drawn to locations where distortions are generated without impairing the observation of the exfoliated picture UP.

(10) In the first embodiment, the distinction between a compression direction and expansion direction of the generated distortion can be intuitively understood since the compression direction distortion DQ is colored with dark gray and the expansion direction distortion DQ is colored with light gray. As a result, for example, a polyp in a distorted part in the compression direction may be predicted to be a compressed fold, and a fold in a distorted part in the expansion direction may be predicted to be an expanded polyp. This enables more accurate diagnosis.

Second Embodiment

In the first embodiment, a computer 3, such as a single workstation or the like independently performs the exfoliated picture process, while in a present embodiment of the present invention, a plurality of computers performs at least one of the processes of the exfoliated picture process through distributed processing. In the second embodiment, like or same reference numerals are given to those components that are the same as the corresponding components of the first embodiment and will not be described.

Figure 18:
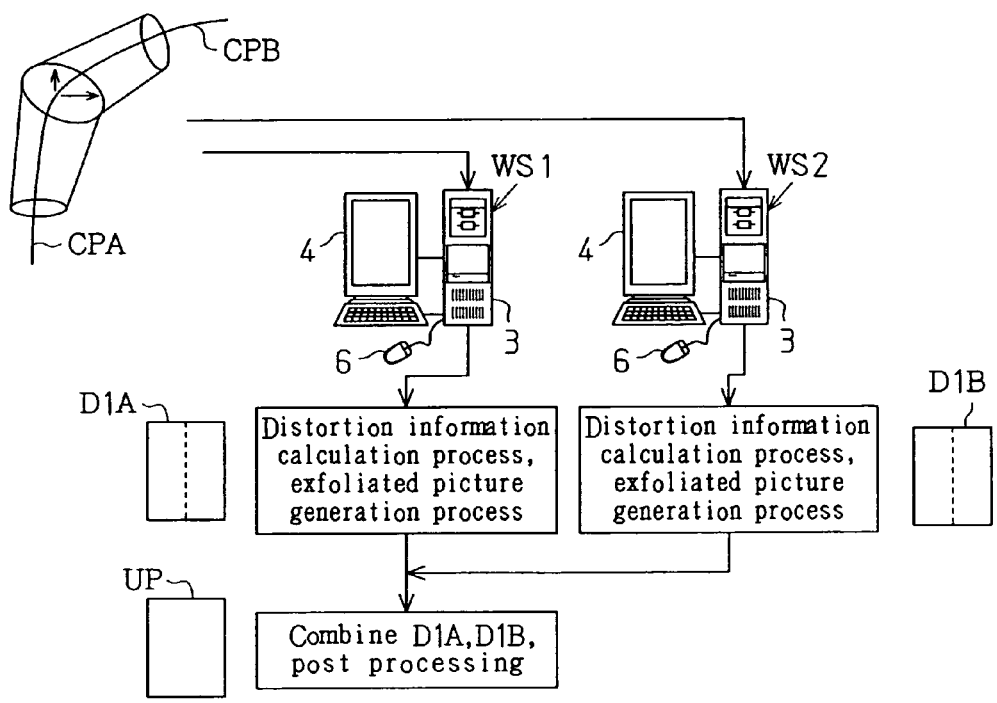
FIG. 18 is a block diagram showing a dispersion process of the exfoliated picture process according to a second embodiment of the preferred embodiment.
Figure 19:
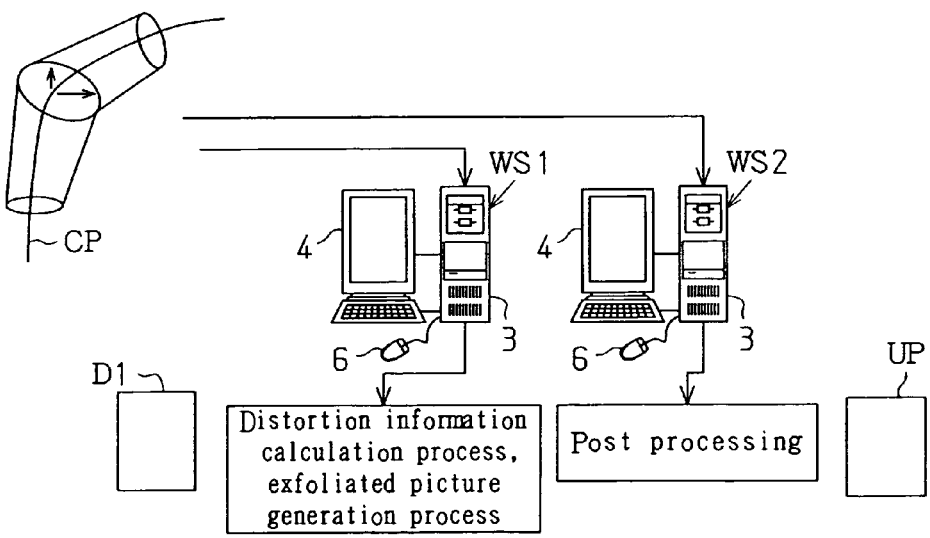
FIG. 19 is a block diagram showing the dispersion process of the exfoliated picture process.
Figure 20:
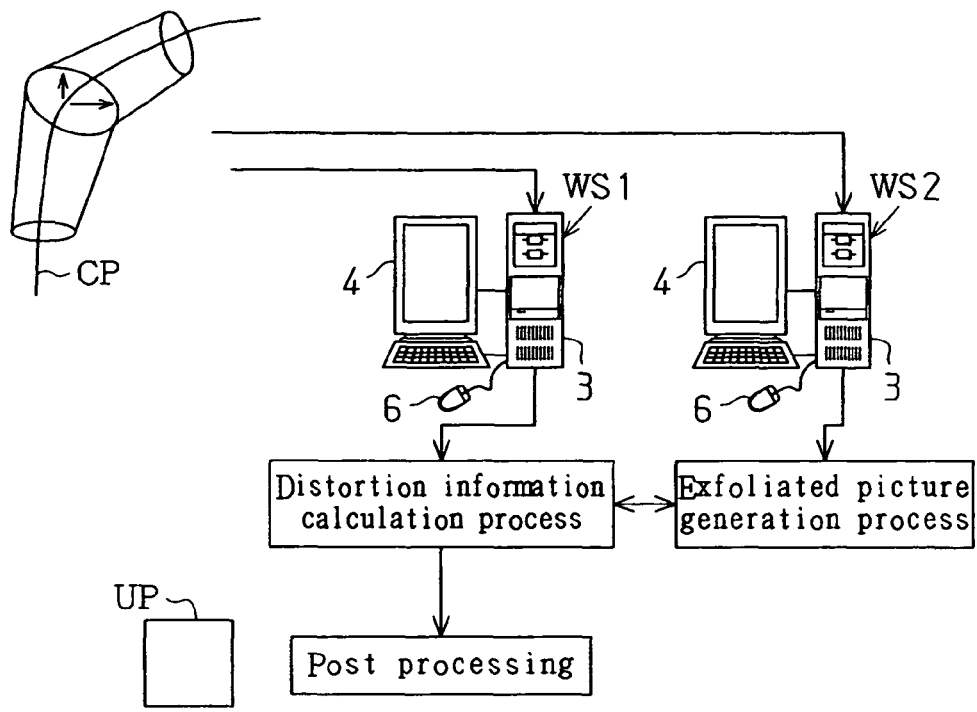
FIG. 20 is a block diagram showing the dispersion process of the exfoliated picture process.

For example, in a network, configured in a hospital with a plurality of connected workstations, at least one process can be performed on a plurality of workstations through distributed processing. Using distributed processing of the exfoliated picture process in the example below, the following three situations are described: division of the length of the central path CP, division of post processing only, and division by the distortion information calculation process and exfoliated picture generating process. Although two workstations SW1 and SW2 are used to create a 512×512 image, as shown in FIGS. 18 to 20, to facilitate the description, a plurality of workstations may perform this by distributed processing. In the present embodiment, the GPU 10 is only installed in the workstation SW2.

EXAMPLE 1

Example 1 describes the division of the central path CP into a central path CPA and central path CPB. As shown in FIG. 18, there is a division of voxels V1-Vk projected by virtual rays starting from the central path CPA, and voxels Vk+1~Vn projected by virtual rays starting from the central path CPB. In this case, the distortion information calculation process and exfoliated picture generating process are performed by the workstations SW1 and SW2, respectively. Therefore, the memory capacity and transfer quantity of the distortion amount memory unit DI of each workstation is one half the size of the exfoliated picture. The processing sequence is described below.

(1-1) The workstation SW1 performs the distortion information calculation process for the voxel data (voxels V1~Vk) corresponding to the central path CPA and stores the calculated distortion information in the distortion amount memory unit DI. Then, the CPU 7 generates exfoliated picture data D1A with added distortion information. The workstation SW2 performs the distortion information calculation process for the voxel data VD (voxels Vk+1~Vn) corresponding to the central path CPB and stores the calculated distortion information in the distortion amount memory unit DI. Then, the CPU 7 generates exfoliated picture data D1B with added distortion information.

(1-2) The workstation SW2 transfers the exfoliated picture data D1B with added distortion information to the workstation SW1. The size of the transferred data at this time is 512×256.

(1-3) The workstation SW1 performs post processing of the exfoliated picture data D1 obtained by synthesizing the exfoliated picture data D1A generated by itself and the exfoliated picture data D1B generated by the workstation SW2, to obtain an exfoliated picture UP with visible distortion information.

EXAMPLE 2

Example 2 describes the division of post processing. As shown in FIG. 19, the distortion information calculation process and exfoliated picture generating process are performed on the entirety of the voxel data VD by the workstation SW1. The time required for post processing can be reduced if post processing is performed by the workstation SW2 with the installed GPU 10 which is capable of high-speed image processing. The processing sequence is described below.

(2-1) The workstation SW1 performs the distortion information calculation process on the voxel data VD and stores the calculated distortion information in the distortion amount memory unit DI.

(2-2) The workstation SW1 generates exfoliated picture data D1 with added distortion information stored in the distortion amount memory unit DI and transfers the exfoliated picture data D1 to the workstation SW2. In this state, the size of the transfer data is 512×512.

(2-3) The workstation SW2 performs post processing of the exfoliated picture data D1 to obtain an exfoliated picture UP with visible distortion information.

EXAMPLE 3

Example 3 describes the division of the distortion information calculation process and exfoliated picture generating process. As shown in FIG. 20, in this case, data is transferred many times between the workstations SW1 and SW2, and the overall processing speed is increased by performing the exfoliated picture generating process in parallel with the distortion information calculation process.

(3-1) The workstation SW1 performs the distortion information calculation process on each slice of the voxel data VD. Then, when the distortion information of each slice is calculated, the data is transferred to the workstation SW2, and the distortion information is stored in the distortion amount memory unit DI of the workstation SW2.

(3-2) The workstation SW2 performs the exfoliated picture generating process in parallel with the distortion information calculation process of the workstation SW1. Then, the exfoliated picture data D1 with added distortion information is generated for each slice after the distortion information calculation process and exfoliated picture generating process ends.

(3-3) When the workstation SW2 generates the exfoliated picture data D1 with added distortion information corresponding to the entirety of the voxel data VD, the exfoliated picture data D1 is transferred to the workstation SW1. Then, the workstation SW2 performs post processing of the exfoliated picture data D1 to obtain an exfoliated picture UP with visible distortion information. In this state, when post processing is executed by the workstation SW2, which incorporates the GPU 10, the overall processing speed is increased.

In addition to the advantages (1) to (10) of the first embodiment, the second embodiment has the advantages described below.

(11) In the second embodiment, since the speed of the exfoliated picture generating process is increased by distributing processing to a plurality of computers 3, it is easy to ensure that exfoliated image UP with distortion information is displayed in real time on the screen 4a of the monitor 4.

(12) In the second embodiment, since distributed processing is performed by a plurality of computers 3, the memory capacity used for the distortion amount memory unit DI is reduced.

It should be apparent to those skilled in the art that the present invention may be embodied in many other specific forms without departing from the spirit or scope of the invention. Particularly, it should be understood that the present invention may be embodied in the following forms.

In the second embodiment, network distributed processing is performed by the workstations SW1 and SW2 connected to the network. The distributed processing may also be performed by a plurality of processors installed in a single computer.

In the second embodiment which is described by way of example of distributed processing of the exfoliated picture process, the following three situations were described, division of the length of the central path CP, division of post processing only, and division by the distortion information calculation process and exfoliated picture generating process. The exfoliated picture process may also be divided for each line when rendering each line of the exfoliated picture UP.

In each of the embodiments, among the distortion amount DQ, the X-direction interval distortion $d\theta$ is calculated from the difference between the first reference projection angle $\theta 0$ and the first real projection angle, and the Y-direction interval distortion dy is calculated from the difference between the second reference projection angle $\phi 0$ and the second real projection angle. However, the distortion amount DQ may also be calculated by the ratio rather than the difference.

In the above embodiments, color information corresponding to the distortion amount DQ is stored in the color information memory unit CI. Alternatively, the color information and distortion amount DQ may be calculated each time a virtual ray R is projected, so that the color information is instantly reflected to the color of the virtual ray R instead of being stored in the color information memory unit CI.

In each of the above embodiments, the difference between the position of the actually projected virtual ray R and the position of a reference virtual ray R is calculated as the distortion amount DQ. However, the distortion amount DQ ($=dr \times \gamma \times c \times (k/k1-1)$) may also be calculated from the direction vector dr of each virtual ray R, the projection angle interval k of the virtual ray R projected from the central path CP, the projection angle interval k1 when virtual rays R are assumed to be uniformly projected from the central path CP, the direction c of the curvature of the central path CP, and the curvature $\gamma$ of the central path CP.

In each of the above embodiments, the difference in angle and position between the actually projected virtual ray R and the reference virtual ray R is calculated as the distortion amount DQ. The difference between the coordinate of each apex of the pixels configuring the cylindrical projection surface 12 and the coordinate of each apex of the pixels configuring the two-dimensional plane 16 may also be calculated as the distortion amount DQ.

In each of the embodiments, the color of the virtual rays R is dark gray when the X-direction interval distortion $d\theta$, Y-direction interval distortion dy, X-direction shear distortion dsx, Y-direction shear distortion dsy, and area distortion dA respectively exceed the first reference value S1, and the color of virtual rays R is light gray when the aforesaid values respectively exceed the second reference value S2. The color of the virtual rays R may also differ for the respective X-direction interval distortion $d\theta$, Y-direction interval distortion dy, X-direction shear distortion dsx, Y-direction shear distortion dsy, and area distortion dA. For example, the virtual rays R may be blue relative to the X-direction interval distortion $d\theta$, red relative to the Y-direction interval distortion dy, green relative to the X-direction shear distortion dsx, yellow relative to the Y-direction shear distortion dsy, and purple relative to the area distortion dA. In this way, whether or not the distortion of each of the components exceeds the first reference value S1 or second reference value S2 can be intuitively understood by the color.

In each of the above embodiments, there is no differentiation between distortion generated by the curvature of the tubular tissue T and distortion generated by the correction of the virtual rays R, and both are calculated as the X-direction interval distortion $d\theta$, Y-direction interval distortion dy, X-direction shear distortion dsx, Y-direction shear distortion dsy, and area distortion dA, and displayed as distortion information. In the above embodiments, distortion generated by the curvature of the tubular tissue T and distortion generated by the correction of the virtual rays R may be calculated separately, and displayed by different colored virtual rays R. In this way, the cause of the distortion and amount of distortion can be intuitively understood. Furthermore, either one of the distortion generated by the curvature of the tubular tissue T and the distortion generated by correcting the virtual rays R may be individually displayed alone. In this case, one or another distortion may be set for display beforehand, or one or another distortion may be selected for display by an observer as required. Thus, for example, it is possible to select not to display distortion generated by the curvature of the tubular tissue T, when a curved location of the tubular tissue T can be observed and understood by observing the exfoliated picture together with the parallel projective image. Therefore, since the least necessary distortion information is displayed, the distortion information does not hinder observation of the exfoliated picture.

Figure 21:
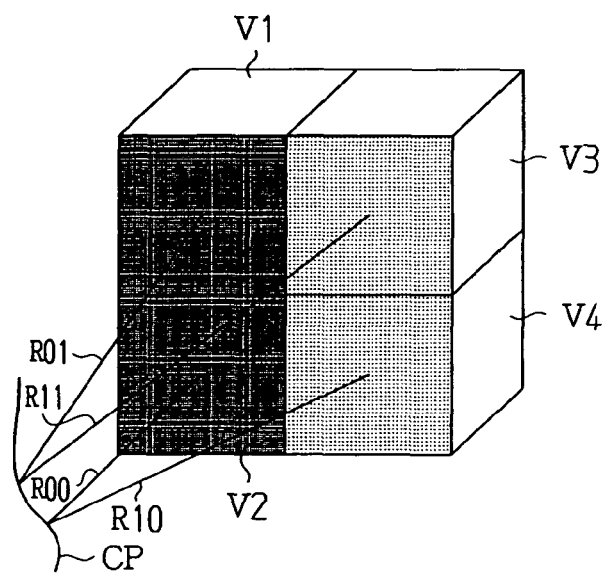
FIG. 21 is a schematic diagram showing another example of distortion information.

In each of the above embodiments, color information corresponding to the distortion amount DQ is added to the virtual rays R as distortion information, and an exfoliated picture UP is generated using the virtual ray R so as to obtain an exfoliated picture UP with added distortion information. The color information corresponding to the distortion amount DQ may also be added to the projection picture 11. That is, color information can be added to each voxel V1 to Vn by changing the shading coefficient $\beta n$ allocated to the voxels V1 to Vn in accordance with the distortion amount DQ. For example, a shading coefficient $\beta n$ corresponding to dark gray may be allocated to voxels V1 and V2 to which virtual rays R having distortion amounts DQ that exceed the first reference value S1 are projected, and a shading coefficient $\beta n$ corresponding to light gray may be allocated to voxels V3 and V4 to which virtual rays R having distortion amounts DQ that exceed the second reference value S2 are projected, as shown in FIG. 21. In this way, an exfoliated picture UP with added distortion information, and a perspective projection picture OP can be obtained as shown in FIG. 14, in the same manner as the above embodiments.

Figure 22:
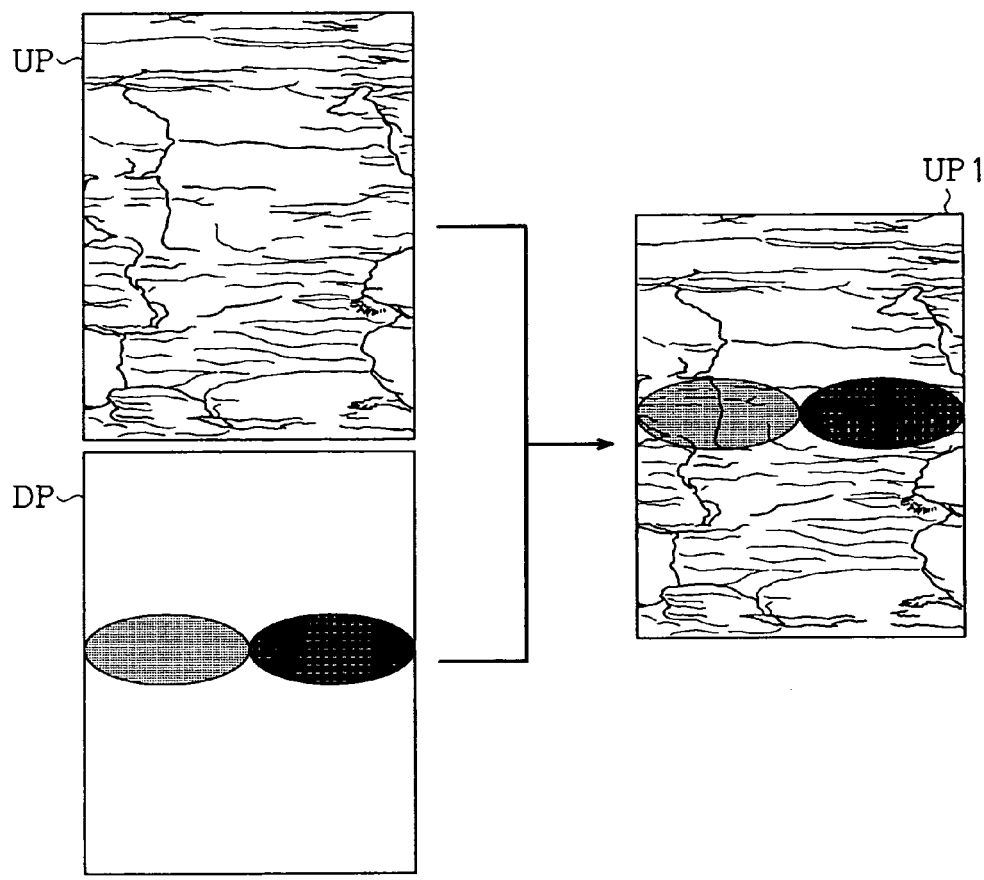
FIG. 22 is a schematic diagram showing another example of distortion information.

In each of the above embodiments, color information corresponding to the distortion amount DQ is added to the virtual rays R as distortion information, and an exfoliated picture UP is generated using the virtual rays R so as to obtain an exfoliated picture UP with added distortion information. A distortion picture DP representing the distortion information may be generated and synthesized with the exfoliated picture UP to generate a new exfoliated picture UP1, as shown in FIG. 22. The exfoliated picture generating process may also be executed after the distortion information calculation process is executed and the distortion picture DP has been generated, or the distortion information calculation process and the distortion picture DP generating process may be executed after the exfoliated picture generating process has been executed.

Figure 23:
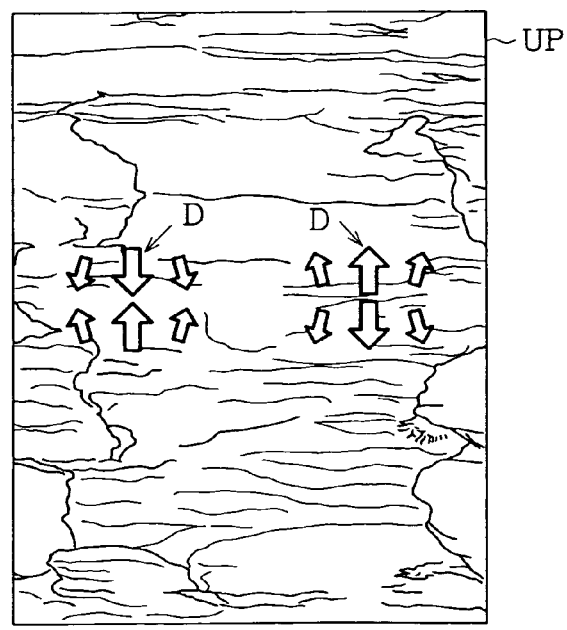
FIG. 23 is a schematic diagram showing another example of distortion information.
Figure 24:
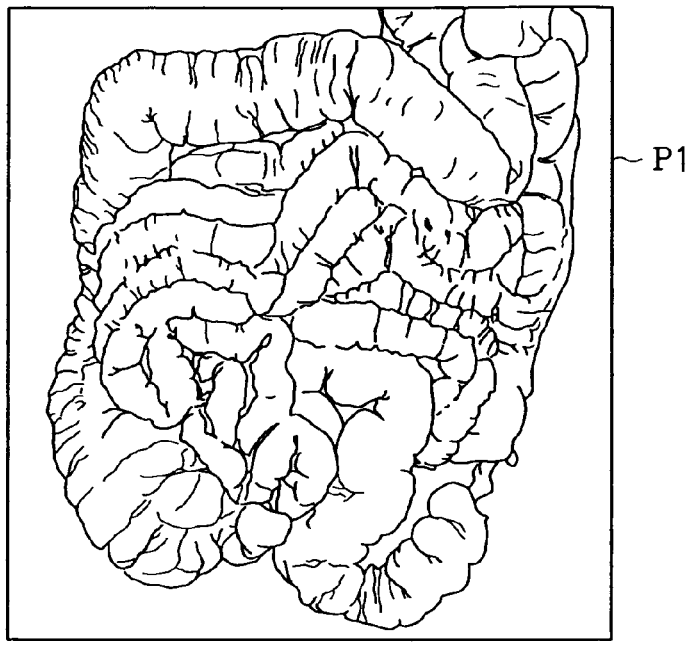
FIG. 24 is a schematic diagram showing a projection picture of a tubular organ produced by the parallel projective method.
Figure 25:
FIG. 25 is a schematic diagram showing a projection picture of a tubular organ produced by the perspective projective method.
Figure 26:
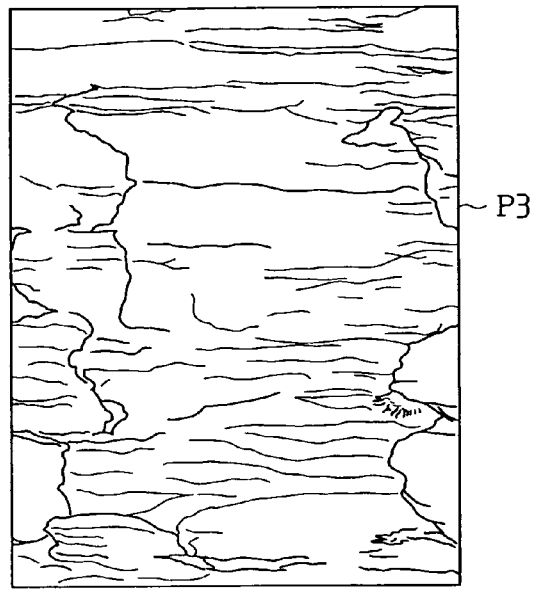
FIG. 26 is a schematic diagram showing an exfoliated picture of a tubular organ.
Figure 27:
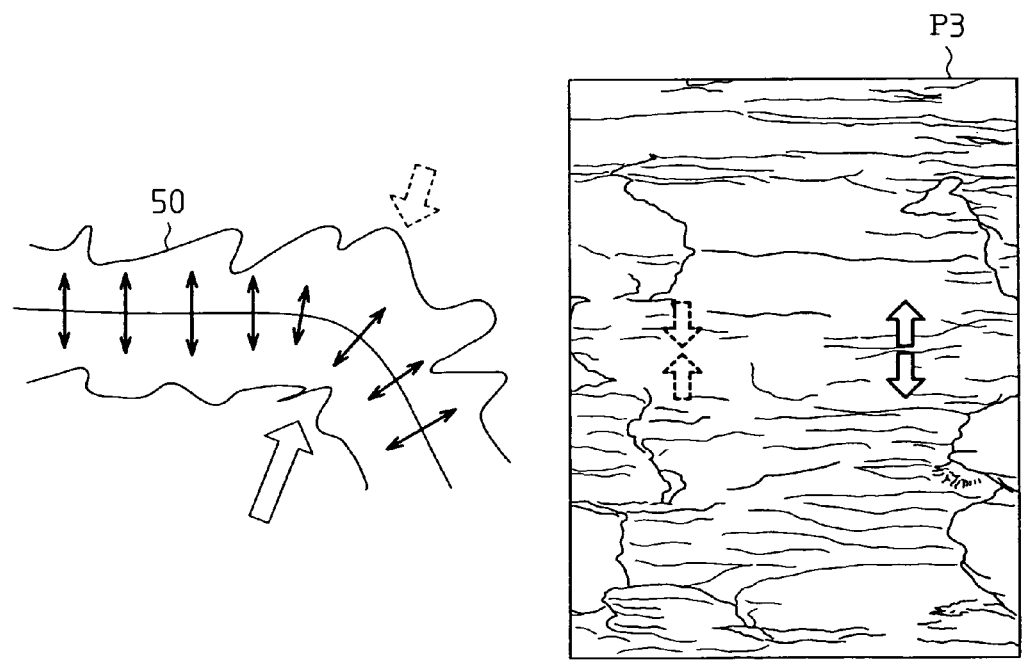
FIG. 27 is a schematic diagram showing an exfoliated picture of a tubular organ.

In the above embodiments, color information corresponding to the distortion amount DQ is added to the virtual rays R as distortion information, and an exfoliated picture UP is generated using the virtual ray R so as to obtain an exfoliated picture UP with added distortion information. Alternatively, an indicator D such as an arrow or the like corresponding to the distortion information may be added to the exfoliated picture UP rather than color information, as shown in FIG. 23. The indicator D may change in size in accordance with the distortion amount DQ, and the direction of the indicator D may change in accordance with the direction of the distortion (compression, expansion), as shown in FIG. 23.

In the above embodiments, color information corresponding to the distortion amount DQ is added to the virtual rays R as distortion information, and an exfoliated picture UP is generated using the virtual rays R so as to obtain an exfoliated picture UP with added distortion information. The location of the generated distortion may be circumscribed by lines without color information. Thus, the distortion information can be intuitively understood when viewing the exfoliated picture, and the distortion information does not impair observation of the exfoliated picture since the information is expressed by lines. Furthermore, the location of generated distortion may also be circumscribed by lines at each location that has the same value of the distortion amount DQ. In this case, the location of generated distortion may be circumscribed by lines that differ in type or lines of different color in accordance with the distortion amount DQ.

In the above embodiments, color information corresponding to the distortion amount DQ is added to the virtual rays R as distortion information, and an exfoliated picture UP is generated using the virtual rays R so as to obtain an exfoliated picture UP with added distortion information. The location of the generated distortion may flash on and off without color information. In this way, an observer's attention is even more drawn to the location of the generated distortion.

In each of the above embodiments, only distortion amounts DQ that exceed the first reference value S1 or second reference value S2 are displayed as distortion information. Alternatively, all of the distortion information DQ may also be displayed as distortion information.

In each of the above embodiments, the distortion amount DQ that exceeds the first reference value S1 is displayed as distortion information in dark gray, and the distortion amount DQ that exceeds the second reference value S2 is displayed as distortion information in light gray. A plurality of reference values may be provided, and color information may be set for each of the plurality of the reference values. In this case, the distribution of the distortion amount DQ can be understood if, for example, distortion information of positive value distortion amounts DQ is displayed in gradations of red, and distortion information of negative distortion amounts DQ is displayed in gradations of blue. Furthermore, this mode is not limited to color information inasmuch as the distribution of distortion amount DQ can be similarly understood by displaying different hatching for each reference value.

Although only distortion amounts DQ that exceed the first reference value S1 or second reference value S2 is displayed as distortion information in the above embodiments, among the distortion information, location with a particularly large distortion amount DQ may be uniquely displayed by flashing on and off or by adding different color information or the like. In this, way the locations that have a particularly large distortion can be brought to the particular attention of an observer.

Although the distortion amount DQ is displayed as distortion information in the above embodiments, the locations having different aspect ratios in the tubular tissue T and exfoliated picture UP may also be displayed. In this way, for example, when the exfoliated picture Up markedly differs from the tubular tissue T due to different aspect ratios in spite of a small distortion amount DQ, the observers attention can be drawn to this condition. The distortion amount DQ and discrepancy in aspect ratio may both be displayed as distortion information, or the distortion amount DQ and discrepancy in aspect ratio may be displayed differently. Furthermore, whether or not the distortion amount DQ and discrepancy in aspect ratio are to be displayed may be set beforehand or may be set as needed by the observer.

In each of the above embodiments, distortion information is normally displayed in the exfoliated picture UP and perspective projection picture OP. In this case, whether or not to display the distortion information in the exfoliated picture UP and perspective projection picture OP may be set beforehand or may be set as needed by the observer. Furthermore, whether or not to display distortion information in either of the exfoliated picture UP and perspective projection picture OP may be set.

Although the perspective projection picture OP and exfoliated picture UP with added distortion information are displayed side by side on the screen 4a of the monitor 4 in the above embodiments, the exfoliated picture UP may also be displayed alone. Furthermore, whether or not to display the perspective projection picture OP may be set beforehand or may be set as needed by the observer.

The perspective projection picture OP and exfoliated picture UP with added distortion information are displayed side by side on the screen 4a of the monitor 4 in the above embodiments. In this case, a parallel projection picture with added distortion information may be displayed rather than the perspective projection picture OP.

The perspective projection picture OP and exfoliated picture UP with added distortion information are displayed on the screen 4a of the monitor 4 in the above embodiments. In this case, a sectional observation image with added distortion information may be displayed rather than the perspective projection picture OP. The sectional observation image is a sectional image of a body including tubular tissue T created by a three-dimensional image projection method such as volume rendering and the like, and is an image that displays an arbitrary section among three-dimensional picture data according to the observation position and observation purpose. The sectional observation image is a combination of a perspective projective image of the tubular tissue T and an image of a sectional plane of the tissue surrounding the tubular tissue T. As a result, the distortion information and relations of the tubular tissue T and the surrounding tissue can be understood since the image provides a grasp of the relationship between the tubular tissue T and the surrounding tissue as well as the conditions within the tubular tissue T.

In each of the above embodiments, the exfoliated picture UP and perspective projection picture OP are displayed on the screen 4a of the monitor 4. In this case, the surface of an extracted region masking an arbitrary three-dimensional shape, such as an organ, sphere, column or the like, that is, a section of an arbitrary shape, may also be displayed together with the exfoliated picture UP rather than the perspective projection picture OP. Furthermore, there may be a plurality of sections of arbitrary shape, an extracted region, or masked interface.

The perspective projection picture OP and exfoliated picture UP with added distortion information are displayed on the screen 4a of the monitor 4 in the above embodiments. In this case, a sectional observation image generated by MPR (multi planar reconstruction) may be used in place of the perspective projection picture OP. MPR is a method for extracting and displaying an arbitrary section of three-dimensional picture data (voxel data VD). For example, slice images of arbitrary section planes can be reconstructed from a plurality of slice images (CT images) imaged from X-direction.

The perspective projection picture OP and exfoliated picture UP with added distortion information are displayed on the screen 4a of the monitor 4 in the above embodiments. In this case, a sectional observation image generated by CPR (curved multi planar reconstruction) may be used in place of the perspective projection picture OP. CPR is a method for extracting and displaying an arbitrary curved section of three-dimensional picture data (voxel data VD). For example, arbitrary curved sections can be extracted and displayed to show small tubular tissue T in a section when observing small tubular tissue T such as blood vessels and the like.

In the above embodiments, the perspective projection picture OP is an arbitrary, sectional plane including the perspective projective image P2 of the tubular tissue T. In this case, the arbitrary section may include a parallel projection picture of the tubular tissue T.

Although the above embodiments have been described in terms of straight virtual rays R radiating from a central path CP in the cylindrical projection method (inflected cylindrical projection method), the virtual rays R may be curved or polygonal rays.

Although the above embodiments have been described in terms of projecting virtual rays R in the same plane from points on the central path CP in the cylindrical projection method (inflected cylindrical projection method), the virtual rays R need not be projected in the same plane and may be projected obliquely.

Although the above embodiments have been described in terms of a straight virtual ray R radiating from a central path CP in the cylindrical projection method (inflected cylindrical projection method), the virtual ray R may radiate from a point near the central path CP or a plurality of points near the central path CP.

Although the exfoliated picture UP and perspective projection picture OP are generated by volume rendering in the above embodiments, the exfoliated picture UP and perspective projection picture OP may be generated by surface rendering. Furthermore, the exfoliated picture UP may also be generated by a combination of volume rendering and surface rendering.

In the above embodiments, volume rendering is accomplished by ray casting. Volume rendering may also be accomplished using other volume rendering methods, such as maximum intensity projection, minimum intensity projection, average intensity projection, Raysum and the like.

Although the distortion information calculation process is performed using three-dimensional picture data in the above embodiments, picture data of four or more dimensions may be used.

Although the exfoliated picture process is performed using CT picture data of part of a human body, such as bone, an organ or the like, in the above embodiments, the present invention is not limited to living tissue, such as humans, animals, and plants insofar as such material can be CT imaged, and the present invention is applicable to geologic examinations, mineral examinations, structural parts of machinery and devices, image processes for viewing electrical circuit patterns, and LSI diagnostics and the like.

Although the exfoliated picture process is performed using CT picture data of part of a human body, such as bone, organ or the like, to visualize distortion information in the above embodiments, the present invention is also applicable to visualizations of scientific calculation results and computer assisted engineering systems.

The present examples and embodiments are to be considered as illustrative and not restrictive, and the invention is not to be limited to the details given herein, but may be modified within the scope and equivalence of the appended claims.

What is claimed is:

1. A method for generating a cylindrical projected picture by executing either one of sole processing and distributed processing with at least one computer to project picture data for three or more dimensions on a cylindrical projection surface and cylindrically project the surface on a projection plane corresponding to the cylindrical projection surface, the method comprising:

calculating warping occurring in each of a plurality of pixels configuring the cylindrical projected picture based on a relationship of length and angle between the plurality of pixels of the cylindrical projected picture and corresponding three-dimensional positions of the plurality of pixels; and outputting warping information including the warping and occurrence location of the warping together with the cylindrical projected picture.

2. The method according to claim 1, wherein the relationship of length and angle includes a relationship of a projection angle and projection position of a virtual ray projected from a center line of the cylindrical projection surface.

3. The method according to claim 1, wherein virtual rays are projected from a center line of the cylindrical projection surface, and at least one of the virtual rays may include warping, the method further comprising:

adding color information associated with the warping to the at least one of the virtual rays including warping; and generating the cylindrical projected picture by projecting the at least one of the virtual rays including the added color information on the cylindrical projection surface, and cylindrically project the surface on the projection plane corresponding to the cylindrical projection surface.

4. The method according to claim 1, wherein the cylindrical projected picture is generated through volume rendering by projecting the picture data for three or more dimensions on the cylindrical projection surface and cylindrically project the surface on the projection plane corresponding to the cylindrical projection surface.

5. The method according to claim 4, wherein virtual rays are projected on a plurality of voxels from a center line of the cylindrical projection surface, and at least one of the virtual rays may include warping, the method further comprising:

adding color information associated with the warping to at least one of the voxels projected by the at least one of the virtual rays including warping; and generating the cylindrical projected picture by projecting the picture data configured by the plurality of voxels including the at least one of the voxels with the added color information on the cylindrical projection surface, and cylindrically project the surface on the projection plane corresponding to the cylindrical projection surface.

6. The method according to claim 4, further comprising:

determining whether or not an aspect ratio of a plurality of voxels differs from an aspect ratio of the plurality of pixels;

wherein said outputting the warping information includes putting special emphasis on the output warping information when determining that the aspect ratios differ.

7. The method according to claim 1, further comprising:
generating a warping picture representing the warping information; and
generating a synthesized image by synthesizing the warping picture and the cylindrical projected picture;
wherein said outputting warping information with the cylindrical projected picture includes outputting the synthesized image as a new cylindrical projected picture.

8. The method according to claim 7, wherein the warping picture includes an indicator added to the occurrence location of the warping.

9. The method according to claim 7, wherein the warping picture includes a line surrounding the occurrence location of the warping.

10. The method according to claim 7, wherein the warping picture includes flashing of the occurrence location of the warping.

11. The method according to claim 1, wherein said outputting the warping information includes outputting the warping information taking into consideration the cause of the warping.

12. The method according to claim 1, wherein said outputting the warping information includes outputting the warping information when the warping exceeds a predetermined value.

13. The method according to claim 1, wherein said outputting the warping information includes emphasizing the output warping information when the warping exceeds a predetermined value.

14. The method according to claim 1, further comprising:
generating a perspective projection picture or a parallel projection picture;
wherein said outputting the warping information includes outputting the projective projection picture or the parallel projection picture with the cylindrical projected picture.

15. The method according to claim 14, further comprising:
adding the warping information, output together with the cylindrical projected picture, to the perspective projection picture or the parallel projection picture.

16. The method according to claim 1, wherein the picture data for three or more dimensions includes data of a tubular organ.

17. The method according to claim 1, wherein the cylindrical projected picture is generated through surface rendering by projecting the picture data for three or more dimensions on the cylindrical projection surface and cylindrically project the surface on the projection plane corresponding to the cylindrical projection surface.

18. A computer program device comprising a computer readable recording medium encoded with a program for generating a cylindrical projected picture by executing either one of sole processing and distributed processing with at least one computer to project picture data for three or more dimensions on a cylindrical projection surface and cylindrically project the surface on a projection plane corresponding to the cylindrical projection surface, the program when executed by the at least one computer causing the at least one computer to execute steps comprising:
calculating warping occurring in each of a plurality of pixels configuring the cylindrical projected picture based on a relationship of length and angle between the plurality of pixels of the cylindrical projected picture and corresponding three-dimensional positions of the plurality of pixels; and
outputting warping information including the warping and occurrence location of the warping together with the cylindrical projected picture.

19. The computer program device according to claim 18, wherein the relationship of length and angle includes a relationship of a projection angle and projection position of a virtual ray projected on a plurality of voxels from a center line of the cylindrical projection surface.

20. The computer program device according to claim 18, wherein virtual rays are projected on a plurality of voxels from a center line of the cylindrical projection surface, and at least one of the virtual rays may include warping, the program causing the at least one computer to further execute steps comprising:
adding color information associated with the warping to the at least one of the virtual rays including warping; and
generating the cylindrical projected picture by projecting the at least one of the virtual rays including the added color information on the plurality of voxels, projecting the plurality of voxels on the cylindrical projection surface, and cylindrically project the surface on the projection plane corresponding to the cylindrical projection surface.

21. The computer program device according to claim 18, wherein virtual rays are projected on a plurality of voxels from a center line of the cylindrical projection surface, and at least one of the virtual rays may include warping, the program causing the at least one computer to further execute steps comprising:
adding color information associated with the warping to at least one of the voxels projected by the at least one of the virtual rays including warping; and
generating the cylindrical projected picture by projecting the picture data configured by the plurality of voxels including the at least one of the voxels with the added color information on the cylindrical projection surface, and cylindrically project the surface on the projection plane corresponding to the cylindrical projection surface.

22. The computer program device according to claim 18, further causing the at least one computer to further execute steps comprising:
generating a warping picture representing the warping information; and
generating a synthesized image by synthesizing the warping picture and the cylindrical projected picture;
wherein the step of outputting warping information with the cylindrical projected picture includes outputting the synthesized image as a new cylindrical projected picture.

23. The computer program device according to claim 22, wherein the warping picture includes an indicator added to the occurrence location of the warping.

24. The computer program device according to claim 22, wherein the warping picture includes a line surrounding the occurrence location of the warping.

25. The computer program device according to claim 22, wherein the warping picture includes flashing of the occurrence location of the warping.

26. The computer program device according to claim 18, wherein the step of outputting the warping information includes outputting the warping information taking into consideration the cause of the warping.

27. The computer program device according to claim 18, wherein the step of outputting the warping information includes outputting the warping information when the warping exceeds a predetermined reference value.

28. The computer program device according to claim 18, wherein the step of outputting the warping information includes emphasizing the output warping information when the warping exceeds a predetermined reference value.

29. The computer program device according to claim 18, further causing the at least one computer to further execute steps comprising:
   determining whether or not an aspect ratio of the plurality of voxels differs from an aspect ratio of the plurality of pixels;
   wherein said outputting the warping information includes putting special emphasis on the output warping information when determining that the aspect ratios differ.

30. The computer program device according to claim 18, further causing the at least one computer to further execute steps comprising:
   generating a perspective projection picture or a parallel projection picture with the picture data;
   wherein the step of outputting the warping information includes outputting the projective projection picture or the parallel projection picture with the cylindrical projected picture.

31. The computer program device according to claim 30, further causing the at least one computer to further execute step comprising:
   adding the warping information, output together with the cylindrical projected picture, to the perspective projection picture or the parallel projection picture.

32. The computer program device according to claim 18, wherein the picture data for three or more dimensions includes data of a tubular organ.

33. The computer program device according to claim 18, wherein the cylindrical projected picture is generated through volume rendering by projecting the picture data for three or more dimensions on the cylindrical projection surface and cylindrically project the surface on the projection plane corresponding to the cylindrical projection surface.

34. The computer program device according to claim 18, wherein the cylindrical projected picture is generated through surface rendering by projecting the picture data for three or more dimensions on the cylindrical projection surface and cylindrically project the surface on the projection plane corresponding to the cylindrical projection surface.

35. An apparatus for generating a cylindrical projected picture by executing either one of sole processing and distributed processing with at least one computer to project picture data for three or more dimensions on a cylindrical projection surface and cylindrically project the surface on a projection plane corresponding to the cylindrical projection surface, the apparatus comprising:
   a warping calculation means for calculating warping occurring in each of a plurality of pixels configuring the cylindrical projected picture based on a relationship of length and angle between the plurality of pixels of the cylindrical projected picture and corresponding three-dimensional positions of the plurality of pixels; and
   an output means for outputting warping information including the warping and occurrence location of the warping together with the cylindrical projected picture.

36. The apparatus according to claim 35, wherein the relationship of length and angle includes a relationship of a projection angle and projection position of a virtual ray projected on a plurality of voxels from a center line of the cylindrical projection surface.

37. The apparatus according to claim 35, wherein virtual rays are projected on a plurality of voxels from a center line of the cylindrical projection surface, and at least one of the virtual rays may include warping, the apparatus further comprising:
   a color information addition means for adding color information associated with the warping to the at least one of the virtual rays including warping; and
   a cylindrical projected picture generation means for generating the cylindrical projected picture by projecting the at least one of the virtual rays including the added color information on the plurality of voxels, projecting the plurality of voxels on the cylindrical projection surface, and exfoliate the cylindrical projection surface on the projection plane corresponding to the cylindrical projection surface.

38. The apparatus according to claim 37, wherein the cylindrical projected picture generation means partially or entirely forms a graphic processing unit.

39. The apparatus according to claim 35, wherein virtual rays are projected on a plurality of voxels from a center line of the cylindrical projection surface, and at least one of the virtual rays may include warping, the apparatus further comprising:
   a color information addition means for adding color information associated with the warping to at least one of the voxels projected by the at least one of the virtual rays including warping; and
   a cylindrical projected picture generation means for generating the cylindrical projected picture by projecting the picture data configured by the plurality of voxels including the at least one of the voxels with the added color information on the cylindrical projection surface, and cylindrically project the surface on the projection plane corresponding to the cylindrical projection surface.

40. The apparatus according to claim 35, further comprising:
   a warping picture generation means for generating a warping picture representing the warping information; and
   a synthesizing means for generating a synthesized image by synthesizing the warping picture and the cylindrical projected picture;
   wherein said output means includes outputting a new cylindrical projected picture based on the synthesized image.

41. The apparatus according to claim 40, wherein the warping picture generation means and the synthesizing means partially or entirely forms a graphic processing unit.

42. The apparatus according to claim 35, further comprising:
   a projection picture generation means for generating a perspective projection picture or a parallel projection picture with the picture data; and
   a warping addition means for adding the warping information, output together with the cylindrical projected picture, to the perspective projection picture or the parallel projection picture;
   wherein the output means outputs the projective projection picture or the parallel projection picture with the cylindrical projected picture.

* * * * *